US010229477B2

(12) United States Patent
Kimura

(10) Patent No.: US 10,229,477 B2
(45) Date of Patent: Mar. 12, 2019

(54) IMAGE PROCESSING DEVICE, IMAGE PROCESSING METHOD, AND PROGRAM

(71) Applicant: Sony Corporation, Tokyo (JP)

(72) Inventor: Atsushi Kimura, Tokyo (JP)

(73) Assignee: Sony Corporation, Tokyo (JP)

( * ) Notice: Subject to any disclaimer, the term of this patent is extended or adjusted under 35 U.S.C. 154(b) by 40 days.

(21) Appl. No.: 14/786,882

(22) PCT Filed: Mar. 13, 2014

(86) PCT No.: PCT/JP2014/056712
§ 371 (c)(1),
(2) Date: Oct. 23, 2015

(87) PCT Pub. No.: WO2014/178234
PCT Pub. Date: Nov. 6, 2014

(65) Prior Publication Data

US 2016/0071238 A1 Mar. 10, 2016

(30) Foreign Application Priority Data

Apr. 30, 2013 (JP) ................................ 2013-095431

(51) Int. Cl.
*G06T 3/40* (2006.01)
*H04N 5/232* (2006.01)
(Continued)

(52) U.S. Cl.
CPC ............ *G06T 3/4038* (2013.01); *G03B 37/02* (2013.01); *G06T 7/33* (2017.01); *H04N 5/23238* (2013.01);
(Continued)

(58) Field of Classification Search
CPC ......... G06T 3/4038; G06T 7/33; G03B 37/02; H04N 5/23238; H04N 5/23296
See application file for complete search history.

(56) References Cited

U.S. PATENT DOCUMENTS 6,549,681 B1 4/2003 Takiguchi et al.
2004/0189849 A1* 9/2004 Hofer .................... G03B 37/04
348/333.03
(Continued)

FOREIGN PATENT DOCUMENTS

EP 1 936 568 A2 6/2008
JP 2004-214830 A 7/2004
(Continued)

OTHER PUBLICATIONS

Extended European Search Report dated Nov. 15, 2016 for corresponding European Application No. 14791479.0.
(Continued)

*Primary Examiner* — Mishawn N Hunter
(74) *Attorney, Agent, or Firm* — Michael Best & Friedrich LLP

(57) ABSTRACT

[Object] To make it possible to generate a panoramic image that offers a stronger sense of presence and immersion to a user without imposing too heavy a load on a user.
[Solution] Alignment determination processing (2) of determining whether or not other captured image data than captured panoramic image data is capable of aligning with the captured panoramic image data in a manner that a captured object remains consistent between the captured panoramic image data and the other captured image data, and image link processing (3) of linking, to the captured panoramic image data, the other captured image data determined to be capable of aligning with the captured panoramic image data are performed. In order to integrate a captured image such as a moving image and a high resolution image other than a captured panoramic image and to generate a captured panoramic image that offers a strengthened sense of presence and immersion, a user only has to shoot a panoramic image and another captured image at substantially the same image capturing spot. Thus, it is possible to
(Continued)

generate a panoramic image that offers a stronger sense of presence and immersion to a user without imposing too heavy a load on a user.

19 Claims, 11 Drawing Sheets

(51) Int. Cl.
*G03B 37/02* (2006.01)
*G06T 7/33* (2017.01)
*H04N 101/00* (2006.01)

(52) U.S. Cl.
CPC .................... *H04N 5/23296* (2013.01); *G06T 2207/20221* (2013.01); *H04N 2101/00* (2013.01)

(56) References Cited

U.S. PATENT DOCUMENTS

| | | | | |
|---|---|---|---|---|
| 2005/0099494 | A1* | 5/2005 | Deng | H04N 1/2112 348/36 |
| 2006/0244826 | A1* | 11/2006 | Chew | G01S 3/7865 348/143 |
| 2007/0286526 | A1 | 12/2007 | Abousleman et al. | |
| 2008/0024390 | A1* | 1/2008 | Baker | G06T 3/4053 345/1.3 |
| 2009/0022422 | A1* | 1/2009 | Sorek | G06T 3/4038 382/284 |
| 2011/0091065 | A1* | 4/2011 | Chandrashekar | G06K 9/4671 382/100 |
| 2011/0142370 | A1* | 6/2011 | Joshi | G06T 3/4038 382/307 |
| 2012/0169842 | A1 | 7/2012 | Chuang et al. | |
| 2012/0200665 | A1 | 8/2012 | Furumura et al. | |
| 2012/0300019 | A1* | 11/2012 | Yang | H04N 5/23232 348/36 |
| 2014/0362174 | A1* | 12/2014 | Fan | G06T 17/05 348/36 |
| 2015/0156416 | A1* | 6/2015 | Filip | H04N 5/23238 348/36 |

FOREIGN PATENT DOCUMENTS

| | | | |
|---|---|---|---|
| JP | 2006-135386 | A | 5/2006 |
| JP | 2009-267792 | A | 11/2009 |
| JP | 2010-050765 | A | 3/2010 |
| JP | 2010-050795 | A | 3/2010 |
| JP | 2010-161520 | A | 7/2010 |
| JP | 2011-076249 | A | 4/2011 |
| JP | 2011-519192 | | 6/2011 |
| JP | 2012-080431 | A | 4/2012 |
| JP | 6176322 | | 7/2017 |
| WO | WO-94/10653 | A1 | 5/1994 |

OTHER PUBLICATIONS

International Search Report; International Application No. PCT/JP2014/056712; Filed: Mar. 13, 2014. (Form PCT/ISA/210).

International Searching Authority Written Opinion; International Application No. PCT/JP2014/056712; dated May 13, 2014. (Form PCT/ISA/237).

Chinese Office Action dated Jan. 19, 2018 for corresponding Chinese Application No. 201480023065.6.

Japanese Office Action dated May 29, 2018 for corresponding Japanese Application No. 2017-136783.

Chinese Office Action dated Aug. 27, 2018 for corresponding Chinese Application No. 201480023065.6.

* cited by examiner

FIG. 1
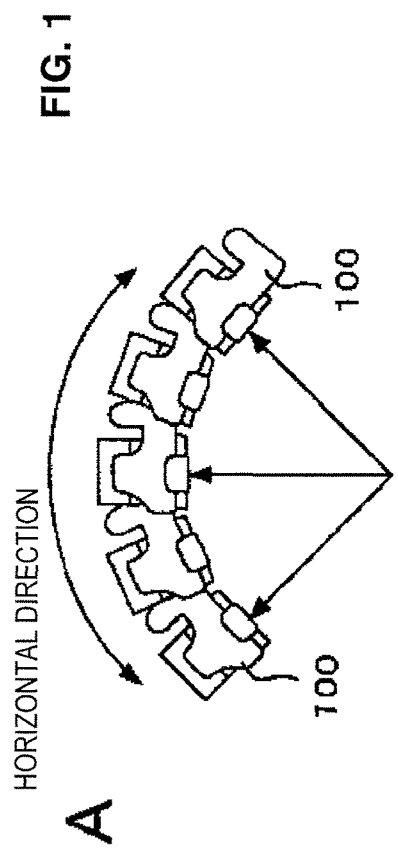
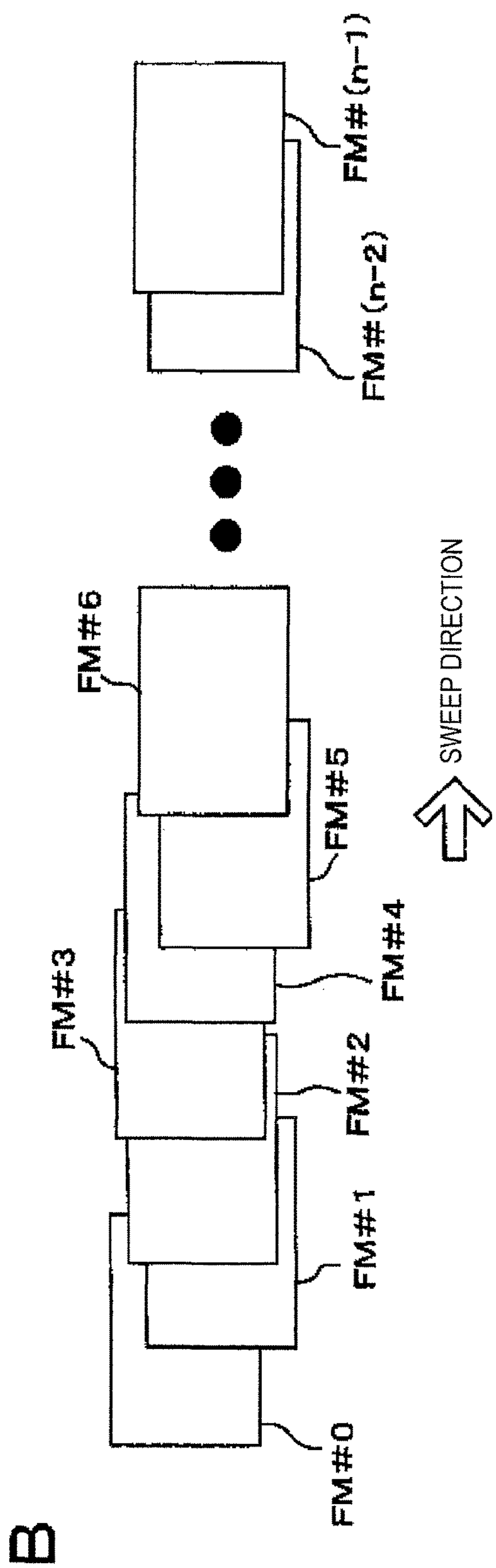

FIG. 2
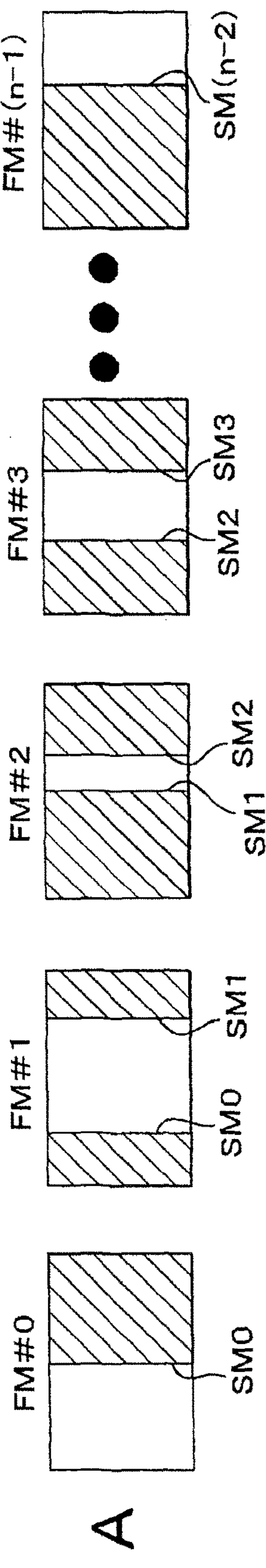
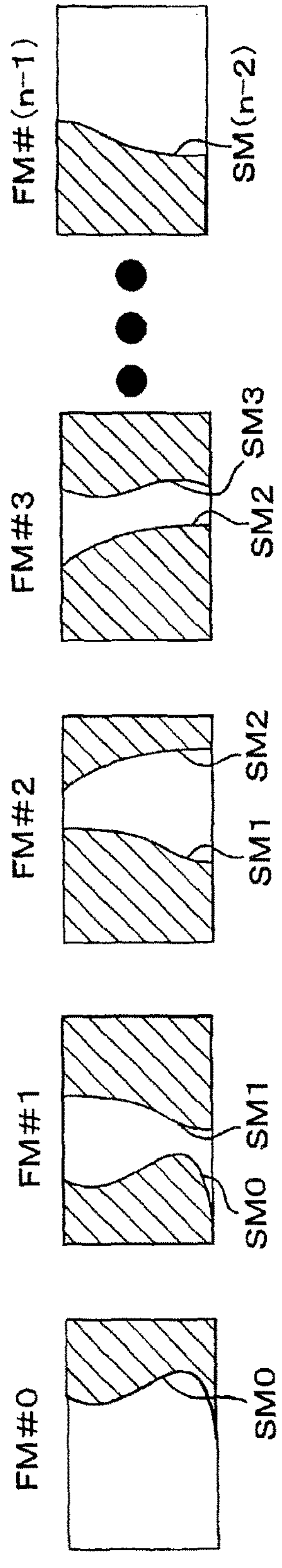

111
LENS UNIT
101
IMAGE SENSOR
102
IMAGE PROCESSING SECTION
102A
PANORAMA COMBINATION PROCESSING SECTION
103
GRAPHIC PROCESSING SECTION
104
RECORDING DEVICE
105
DISPLAY SECTION
106
COMMUNI -CATION SECTION
112
107
MEMORY SECTION
108
CONTROL SECTION
109
OPERATION SECTION
110
SENSOR SECTION

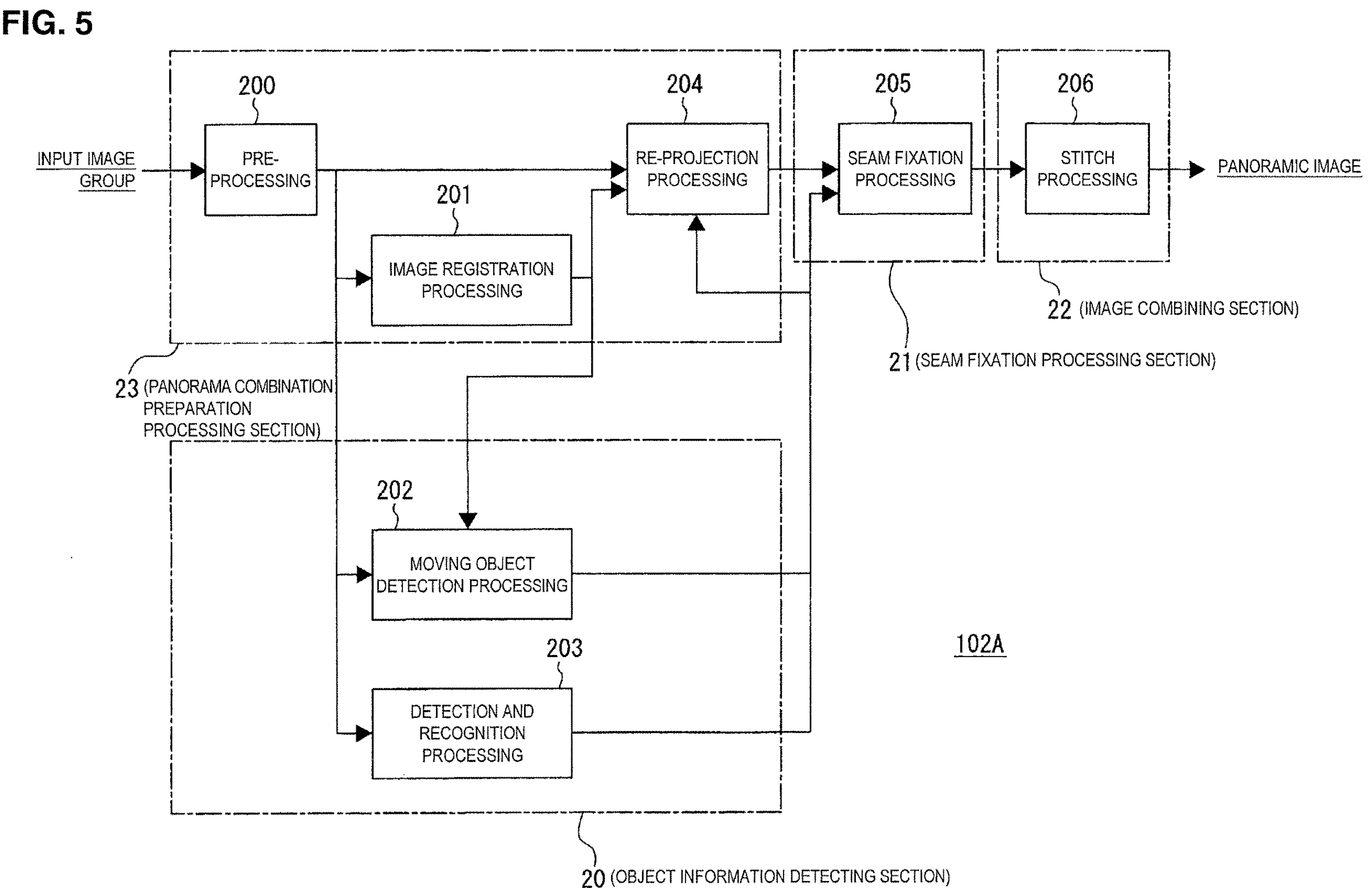
FIG. 5
INPUT IMAGE GROUP
200
PRE-PROCESSING
201
IMAGE REGISTRATION PROCESSING
204
RE-PROJECTION PROCESSING
205
SEAM FIXATION PROCESSING
206
STITCH PROCESSING
PANORAMIC IMAGE
22 (IMAGE COMBINING SECTION)
21 (SEAM FIXATION PROCESSING SECTION)
23 (PANORAMA COMBINATION PREPARATION PROCESSING SECTION)
202
MOVING OBJECT DETECTION PROCESSING
203
DETECTION AND RECOGNITION PROCESSING
102A
20 (OBJECT INFORMATION DETECTING SECTION)

A

B

| UUID | FILE NAME |
| --- | --- |
| 50-1 | F1 |
| | F2 |
| | F3 |
| 50-2 | F8 |
| | F9 |
| | ⋮ |
| | F14 |
| | F15 |

CPU
71
ROM
72
RAM
73
74
75
INPUT/OUTPUT INTERFACE
INPUT SECTION
76
OUTPUT SECTION
77
STORAGE SECTION
78
COMMUNICATION SECTION
79
DRIVE
80
REMOVABLE MEDIUM
81
70 (COMPUTER DEVICE)

IMAGE PROCESSING DEVICE, IMAGE PROCESSING METHOD, AND PROGRAM

TECHNICAL FIELD

The present technology relates an image processing device that performs image processing for captured panoramic image data, an image processing method, and a program for the image processing.

CITATION LIST

Patent Literature

Patent Literature 1: JP 2010-161520A
Patent Literature 2: JP 2011-519192T

BACKGROUND ART

For example, as described in Patent Literature 1, such a panorama combining technology has been known that generates a single panoramic image from a plurality of captured images.

A variety of panorama combining technologies are possible depending on each element including an image shooting technique (such as horizontal sweep image shooting, horizontal and vertical free swing image shooting, and multi-row image shooting), an optical system (such as a wide-angle lens and a fish-eye lens) and a combination algorithm, and make it possible to shoot whole circumference images encompassing a 360-degree scene that surrounds a user (photographer) and omnidirectional panoramic images including even a scene right above or below a user (photographer).

Such panoramic images are generally recorded as images projected to cylindrical surfaces, spherical surfaces or the like, and can be reproduced in reproduction modes of cameras or by image viewers or the like in personal computers (PCs).

Panoramic images projected to cylindrical surfaces or spherical surfaces can be further re-projected to and displayed on virtual plane screens, thereby offering a strong sense of presence and immersion to users (e.g. QuickTime VR?An Image-Based Approach to Virtual Environment Navigation [Apple Computer, Inc.]).

Since those panorama combining technologies characteristically combine a plurality of images shot from different positions, it is difficult to generate panoramic moving images. As a technique of creating a panoramic moving image, a technique of using a specialized optical system such as a quadratic curve mirror capable of shooting an image of the whole circumference at a single exposure has been gaining widespread use. However, the technique enlarges the whole circumference image formed on an image sensor to create a panoramic image, unfortunately degrading the resolution considerably.

Such techniques have also been known that make a plurality of cameras concurrently capture images and use a dedicated camera device such as a multi-eye camera, but it is too difficult for general users to casually use the techniques.

Furthermore, there is certainly a technology of automatically shoot an image with a pan tilter and a telephoto lens or the like to generate a super high resolution panoramic image having some gigapixels (billion pixels), but a specialized device, the pan tilter, is required and it takes a very long time to shoot images and combine the shot images. Moreover, the generated panoramic image has an enormous data size, so that it is not also easy for general users to casually use the technique.

Moving images and high resolution are important elements to have panoramic images offer a strengthened sense of presence and immersion, but as described above, it is difficult for general users to incorporate those elements under the circumstances.

Additionally, Patent Literature 2 discloses a technology of jointing pieces of recorded data having similar positional data to present a panoramic scene to a user.

SUMMARY OF INVENTION

Technical Problem

If a device can automatically paste and integrate a moving image and a high resolution image into a panoramic image, it is possible to generate a panoramic image that offers a stronger sense of presence and immersion to a user without imposing too heavy a load on a user.

Unfortunately, no specific technique has been devised yet under the circumstances.

An object of the present technology is to generate a panoramic image that offers a stronger sense of presence and immersion to a user without imposing too heavy a load on a user.

Solution to Problem

First, an image processing device according to the present technology includes: an alignment determination processing section configured to determine whether or not other captured image data than captured panoramic image data is capable of aligning with the captured panoramic image data in a manner that a captured object remains consistent between the captured panoramic image data and the other captured image data; and an image link processing section configured to link, to the captured panoramic image data, the other captured image data determined by the alignment determination processing section to be capable of aligning with the captured panoramic image data.

According to the above-described configuration, it is possible to link the captured image data determined to be capable of aligning with the captured panoramic image data to the captured panoramic image data.

Second, it is desirable that, in the image processing device according to the present technology, the other captured image data includes any of moving image data and still image data that serves as high resolution image data captured at an angle of view which is on a telephoto side as compared to a set angle of view for capturing a panoramic image of the captured panoramic image data. The moving image or the high resolution image is preferable for integration into a captured panoramic image to strengthen a sense of presence and immersion.

Third, it is desirable that, in the image processing device according to the present technology, the alignment determination processing section changes determination techniques in accordance with an image type of the other captured image data.

This allows an appropriate alignment determination technique to be used in accordance with the image type.

Fourth, it is desirable that, in the image processing device according to the present technology, the other captured image data includes both the moving image data and the still image data, and the alignment determination processing section determines the moving image data on a determination criterion lower than a determination criterion of the still image data.

Characteristically, the moving image data is likely to include a relatively large number of frame images that fail in alignment, so that a determination is made on a low determination criterion according thereto.

Fifth, it is desirable that, in the image processing device according to the present technology, when it is consecutively determined that a predetermined number of pieces of frame image data or more are incapable of alignment, or when a proportion of a number of the pieces of frame image data determined to be incapable of alignment to a total number of frames is greater than or equal to a predetermined value, the alignment determination processing section determines that a whole of the moving image data is incapable of aligning with the captured panoramic image data.

Accordingly, an alignment determination is made on the moving image with a proper determination criterion based on the number of consecutive frame images incapable of alignment and the proportion to the total number of frames.

Sixth, it is desirable that, in the image processing device according to the present technology, the other captured image data includes multi-zoom image data including pieces of still image data captured at a plurality of angles of view which is on a telephoto side as compared to a set angle of view for capturing a panoramic image of the captured panoramic image data, when the other captured image data is the multi-zoom image data, the alignment determination processing section determines whether or not each piece of still image data included in the multi-zoom image data is capable of aligning with the captured panoramic image data, and the link processing section does not link, to the captured panoramic image data, the piece of still image data determined by the alignment determination processing section to be incapable of aligning with the captured panoramic image data.

The multi-zoom image requires relatively high alignment accuracy because users focus on enjoying high resolution images.

Seventh, it is desirable that, in the image processing device according to the present technology, the alignment determination processing section determines whether or not each piece of still image data included in the multi-zoom image data is capable of aligning with the captured panoramic image data, and determines that a whole of the multi-zoom image data is incapable of aligning with the captured panoramic image data in presence of the piece of still image data determined as a result to be incapable of aligning with the captured panoramic image data.

Accordingly, unless it is determined that all the pieces of still image data included in the multi-zoom image data are capable of alignment, none of the pieces of still image data are linked to the captured panoramic image data even in the presence of a piece of still image data capable of alignment.

Eighth, it is desirable that, in the image processing device according to the present technology, the alignment determination processing section determines whether or not two target images are capable of aligning with each other, on the basis of a result acquired by executing image registration processing of detecting feature points and corresponding points in the two target images, detecting local and global movement on the basis of coordinates of the detected corresponding points, and detecting an optimal positional relationship between the two images in a robust estimation method.

Accordingly, the alignment processing is performed as the image registration processing in the alignment determination processing.

Ninth, it is desirable that, in the image processing device according to the present technology, the alignment determination processing section determines that captured image data having a number of the detected feature points less than a predetermined value is incapable of alignment.

The number of detected feature points less than the predetermined value means a uniform image poor in features.

Tenth, it is desirable to determine that captured image data having a number of the detected corresponding points less than a predetermined value is incapable of alignment in the image processing device according to the present technology.

The number of detected corresponding points less than the predetermined value means that there are a few feature points which can be considered to be the same between the two images.

Eleventh, it is desirable that, in the image processing device according to the present technology, the alignment determination processing section performs robust estimation processing of an RANSAC in the image registration processing, and determines that captured image data having a number of detected inliers acquired in a process of the robust estimation processing less than a predetermined value is incapable of alignment.

The number of detected inliers less than the predetermined value means that there are a few feature points which indicate the global movement (i.e. movement of the background), which is to be used as a criterion for alignment.

Twelfth, it is desirable that the image processing device according to the present technology further includes: a selection processing section configured to select the captured panoramic image data and the other captured image data to be processed by the alignment determination processing section.

This allows the alignment determination processing section to perform only the determination processing on the panoramic image data and the other captured image data selected by the selection processing section.

Thirteenth, it is desirable that the image processing device according to the present technology further includes: an alignment information addition processing section configured to add alignment information with respect to the captured panoramic image data to the other captured image data determined by the alignment determination processing section to be capable of alignment.

The alignment information is required to integrate the captured panoramic image data and the other captured image data.

Advantageous Effects of Invention

According to the present invention, in order to integrate a captured image such as a moving image and a high resolution image other than a captured panoramic image and to generate a panoramic image that offers a strengthened sense of presence and immersion, a user only has to shoot a panoramic image and another captured image at substantially the same image capturing spot. Thus, it is possible to generate a panoramic image that offers a stronger sense of presence and immersion to a user without imposing too heavy a load on a user.

BRIEF DESCRIPTION OF DRAWINGS

FIG. 1 is a diagram for describing an overview of panorama combination.

FIG. 2 is a diagram illustrating an example of a seam.

FIG. 5 is a diagram illustrating, as a functional configuration, processing executed as panorama combination processing.

DESCRIPTION OF EMBODIMENTS

Figure 3:
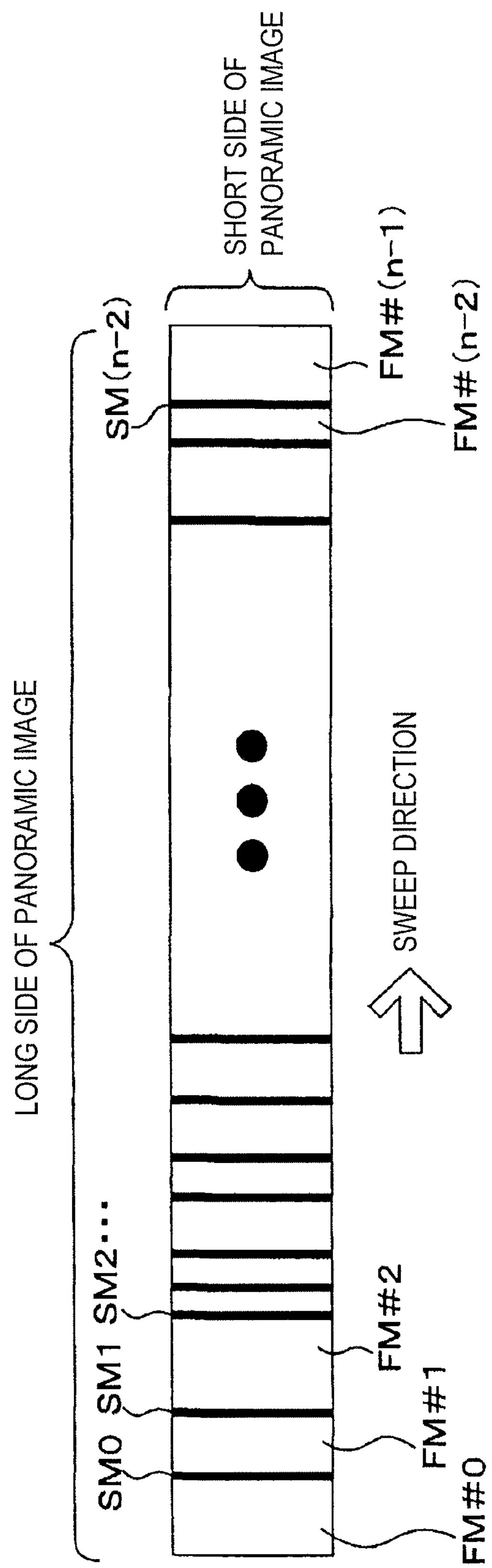
FIG. 3 is a diagram illustrating a relationship between a panoramic image and a seam.

An embodiment of the present technology will be described below.

Description will be given in the following order.

<1. On Panorama Combination>
<2. Configuration of Image Processing Device>
[2-1. Entire Configuration]
[2-2. Panorama Combination Processing]
<3. Flow to Link>
[3-1. Overview]
[3-2. On Alignment Determination Processing]
[3-3. On Link Processing]
<4. Processing Procedure>
<5. Conclusion>
<6. Program>
<7. Modification>
<8. Present Technology>

<1. On Panorama Combination>

First of all, the overview of panorama combination will be described.

An image capturing device 100 according to an embodiment described below and general image capturing devices (digital still cameras) in recent years can generate a panoramic image (captured panoramic image data) by performing combination processing on a plurality of still images (panorama frame image data) that a person who captures an image has captured while rotating the image capturing device 100 at a certain spot (rotation axis).

FIG. 1 A illustrates the movement of the image capturing device 100 for capturing a panoramic image. Since a disparity between the background and the foreground makes the joint of combined images unnatural in the panoramic image, it is desirable to use a point specific to a lens referred to as nodal point, at which no disparity is observed, as the rotation center for capturing an image. The rotation of the image capturing device 100 for capturing a panoramic image is referred to as "sweep."

FIG. 1B is a schematic diagram illustrating that a plurality of still images acquired through a sweep of the image capturing device 100 are appropriately aligned. This figure illustrates the respective captured still images in chronological order from the first captured image. That is to say, still images captured from time 0 to time (n-1) are referred to as pieces of panorama frame image data FM#0, FM#1 . . . FM#(n-1).

If a panoramic image is generated from n still images, combination processing is performed on a series of n pieces of panorama frame image data FM#0 to FM#(n-1) consecutively captured as illustrated in the figure.

As illustrated in FIG. 1B, each piece of captured frame image data necessarily has to overlap with the adjacent piece of frame image data in part. Accordingly, time intervals for the image capturing device 100 to capture pieces of frame image data and an upper limit of a photographer's sweep velocity have to be appropriately set.

A group of frame image data aligned in this way has a large number of overlapping parts, so that it is necessary to decide an area of each piece of frame image data to be used for a final panoramic image. In other words, this is the same as deciding a joint (seam) of images in panorama combination processing.

FIGS. 2A and 2B each illustrate an example of a seam SM.

A seam includes a straight line vertical to the sweep direction as illustrated in FIG. 2A and a non-straight line (such as a curve) as illustrated in FIG. 2B.

A seam SMO represents a joint between pieces of panorama frame image data FM#0 and FM#1, a seam SMI represents a joint between pieces of panorama frame image data FM# 1 and FM#2, . . . a seam SM(n-2) represents a joint between pieces of panorama frame image data FM#(n-2) and FM#(n-1) in FIGS. 2A and 2B.

Additionally, if these seams SMO to SM(n-2) are used as joints between combined adjacent images, shaded image areas in the respective pieces of frame image data are not used for a final panoramic image.

When panorama combination is conducted, blend processing is performed on an image area around a seam in some cases in order to improve the unnaturalness of the image around the seam.

Blend processing is widely performed on parts common to the respective pieces of frame image data to bond the respective pieces of frame image data on one hand. Each pixel contributing to a panoramic image is selected from the common parts on the other hand. In these cases, there is no clear joint, but such a wide bonded part will also be treated as a seam in the present description.

Aligning the respective pieces of frame image data as illustrated in FIG. 1B generally results in slight movement not only in the sweep direction, but also in the direction vertical to the sweep direction. This is a discrepancy caused by a camera shake of a photographer or the like to perform a sweep operation.

Deciding seams of the respective pieces of frame image data, bonding the respective pieces of frame image data by bonding the border areas or performing blend processing on the border areas, and finally trimming unnecessary parts in the direction vertical to a sweep on the basis of the amount of a camera shake offer a wide angle panoramic image having the sweep direction as the longitudinal direction as illustrated in FIG. 3.

FIG. 3 illustrates seams in vertical lines, and schematically illustrates that n pieces of panorama frame image data FM#0 to FM#(n-1) are bonded at seams SM0 to SM(n-2) to generate a panoramic image.

A specific example of an operation performed by a user (photographer) with the image capturing device 100 in order to acquire such a panoramic image will be described.

First of all, a user sets the image capturing device 100 to a panoramic image capturing mode, and further sets a maximum image capturing angle of view. A user can select, for example, 120 degrees, 180 degrees, and 360 degrees as the maximum image capturing angle of view. If a user selects 360 degrees, it is possible to capture a so-called omnidirectional image including all the scenes around the user. Additionally, if 360 degrees are set as the maximum image capturing angle of view in the panoramic image capturing mode, the wording "360-degree panoramic image capturing mode" is used. Meanwhile, if 180 degrees are set as the maximum image capturing angle of view in the panoramic image capturing mode, the wording "180-degree panoramic image capturing mode" is used.

Next, a user presses down the shutter button of the image capturing device 100 to begin to capture a panoramic image, and performs a sweep operation. If a termination condition of panoramic image capturing is satisfied thereafter, panoramic image capturing is finished. For example, the termination conditions are as follows:

A preset maximum image capturing angle of view is reached,

A sweep operation performed by a user is stopped,

A user presses down the shutter button again,

A user lifts his or her finger from the shutter button (in the specifications that the shutter button remains pressed down while a panoramic image is being captured), and Some error occurs.

The panorama combination processing is automatically started after image capturing is completed. The combination of a panoramic image is completed after some time, and the panoramic image data is stored in a recording device.

It is possible thereafter to list and display the pieces of panoramic image data in the same way as general still images.

An example of the panoramic image data generated in this way and a display instance thereof will be described.

FIG. 4A is a schematic diagram of projection processing performed for panorama combination. A variety of processing methods for panorama combination are possible, but processing of projection, for example, to a cylindrical surface, a spherical surface, and a cube is frequently performed. This is referred to as "projection processing (re-projection processing) for combination" for convenience of description, and distinguished from "projection processing for display," which is performed for projective display discussed below.

FIG. 4A illustrates many pieces of panorama frame image data FM captured in a panoramic image capturing operation while the image capturing device 100 is being swept. The panorama frame image data FM or a captured image generated in the same way as the normal photography can be acquired by projecting a three-dimensional scene to a plane surface (such as an imager plane of a camera). When the panoramic image data as illustrated in FIG. 3 is generated from those many pieces of panorama frame image data FM, each piece of panorama frame image data FM is projected, for example, to a cylindrical surface FR as the projection processing for combination. The figure illustrates, along the cylindrical surface FR, pieces of panorama frame image data FMpd that are schematically projected.

Those pieces of panorama frame image data FMpd subjected to the projection processing for combination in this way are jointed to generate panoramic image data PD as illustrated in FIG. 4B. The panoramic image data PD can be regarded as image data re-projected to the cylindrical surface FR from the perspective of a projection center CT.

<2. Configuration of Image Processing Device>

[2-1. Entire Configuration]

Figure 4:
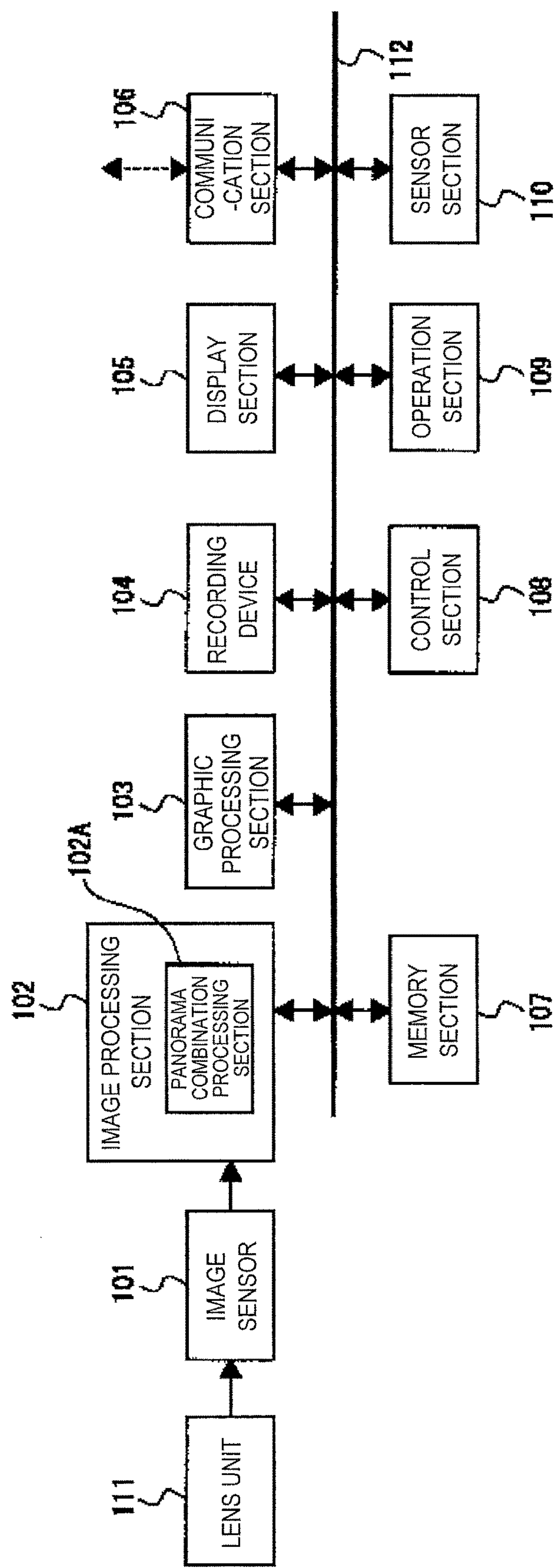
FIG. 4 is a diagram illustrating a configuration example of an image capturing device including an image processing device according to an embodiment.

FIG. 4 illustrates a configuration example of the image capturing device 100 including an image processing device 1 according to an embodiment of the present technology.

The image capturing device 100 includes a lens unit 110, an image sensor 101, an image processing section 102, a graphic processing section 103, a recording device 104, a display section 105, a communication section 106, a memory section 107, a control section 108, an operation section 109, and a sensor section 110.

Although not illustrated in the figure, the image processing device 1 according to the present embodiment represents a schematic device implemented through processing performed by the image processing section 103 and the control section 108.

The image processing section 102, the graphics processing section 103, the recording device section 104, the display section 105, the communication section 106, the memory section 107, the control section 108, the operation section 109, and the sensor section 110 are connected to each other via a bus 112, and image data, a control signal and the like are exchanged therebetween.

The lens unit 111 collects an optical image of an object. The lens unit 111 includes a mechanism of adjusting a focal distance, an object distance, a diaphragm, and the like in accordance with an instruction from the control section 108 in a manner that an appropriate image can be acquired. The lens unit 111 further includes an image stabilizing mechanism for optically preventing an image from being blurred.

The image sensor 101 photoelectrically converts an optical image collected by the lens unit 111 into an electrical signal (image capturing signal). Specifically, the image sensor 101 is implemented by a charge coupled device (CCD) image sensor, a complementary metal oxide semiconductor (CMOS) image sensor, or the like.

The image processing section 102 includes a sampling circuit that samples an electrical signal from the image sensor 101, an A/D conversion circuit that converts an analog signal into a digital signal, and an image processing circuit that performs predetermined image processing on a digital signal. This image processing section 102 performs processing of acquiring image data based on an image capturing signal acquired by the image sensor 101. It is possible to generate moving image data as the image data in addition to still image data that can also be used as the panorama frame image data FM.

The image processing section 102 has a panorama combining function for implementing the panorama combination. Processing performed by the image processing section 102 for implementing the panorama combining function is schematically represented by a "panorama combination processing section 102A" in the figure.

The image processing section 102 includes not only a dedicated hardware circuit, but also a central processing unit (CPU) and a digital signal processor (DSP), and can perform software processing to support flexible image processing.

The graphics processing section 103 is hardware for generating 2D and 3D graphics at high speed, and is generally referred to as graphics processing unit (GPU). The GPU includes not only a hardware circuit dedicated to a specific function, but also a programmable processor, and can perform flexible graphics processing. The characteristics of the programmable processor allows the computing performance of the GPU to be used for purposes other than graphics, and the use of the GPU in this way is generally referred to as general purpose computing on GPU (GPGPU).

The recording device 104 includes recording media such as semiconductor memory including flash memory, a magnetic disk, an optical disc and a magneto-optical disk, and a recording and reproducing system circuit and mechanism for these recording media.

When the image capturing device 100 captures a still image, the image processing section 102 encodes the captured still image into a predetermined still image format such as the Joint Photographic Experts Group (JPEG) format, and then the still image data stored in the memory section 107 is recorded in a recording medium. When the image capturing device 100 captures a moving image, the image processing section 102 encodes the captured moving image into a predetermined moving image format such as the Advanced Video Codec High Definition (AVCHD) format, and then the moving image data stored in the memory section 107 is recorded in a recording medium.

The still image data and the moving image data are read by the memory section 107 when reproduced, and the image processing section 102 performs decoding processing thereon. The decoded image data can be displayed on the display section 105 or transmitted and output to an external device by the communication section 106.

The display section 105 includes a D/A conversion circuit that converts, into an analog, the image data processed by the image processing section 102 and stored in the memory section 107, a video encoder that encodes an image signal converted into an analog into a video signal in a format adapted to a downstream display device, and a display device that displays an image corresponding to the input video signal.

The display devices are implemented, for example, by a liquid crystal display (LCD), an organic electroluminescence (EL) panel, and the like, and also have the function of a viewfinder.

The communication section 106 communicates with an external device and performs network communication. Specifically, the communication section 106 includes a mobile communication system referred to as 3G or 4G communication for a mobile phone system, and a module that performs wireless communication with a wireless local area network (LAN) supported by IEEE802.11 series or performs wired communication with a wired LAN, a universal serial bus (USB), or Thunderbolt. This makes it possible to exchange data with a device such as an external personal computer, a mobile phone, a smartphone and a tablet, and a variety of servers via the Internet.

Additionally, various examples of transmission paths for communication performed by the communication section 106 are possible, and both of a wireless transmission path with radio waves, infrared rays, or the like, and a wired transmission path with a cable connection may be, for example, used. Any signal format can also be used, and digital electrical signal communication, analog electrical signal communication, optical communication, or the like is possible.

The memory section 107 includes semiconductor memory such as dynamic random access memory (DRAM), and temporarily records the image data processed by the image processing section 102, and a control program and various kinds of data for the control section 108.

The control section 108 includes a CPU and a control program, and controls each section of the image capturing device 100. The control program in itself is actually stored in the memory section 107, and executed by the CPU.

The operation section 109 includes an input device such as a hardware key including a shutter button, an up/down/left/right arrow key, an enter key and a cancel key, an operation dial, a touch panel, and a zoom lever, detects an input operation of a photographer (user), and delivers information according to the input operation to the control section 108. The control section 108 decides the operation of the image capturing device 100 in accordance with the operation input information, and exerts control in a manner that each section performs a necessary operation.

The sensor section 110 includes a gyro sensor, an acceleration sensor, a global positioning system (GPS) sensor and a geomagnetic sensor, and detects various kinds of information. These kinds of information are added to captured image data as metadata, and are further used for various kinds of image processing and control processing.

In particular, whenever an image is captured, positional information from the GPS sensor is acquired by the control section 108, and then added to image data (including the panoramic image data PD) as data (image capturing spot data) indicating an image capturing spot.

[2-2. Panorama Combination Processing]

Next, the panorama combination processing executed by the image capturing device 100 according to the present embodiment will be described in detail.

FIG. 5 illustrates, as a functional configuration, processing executed by the image processing section 102 as the panoramic combination processing section 102A, and illustrates processing executed in the functional configuration component.

An object information detecting section 20, a seam fixation processing section 21, an image combining section 22, and a panorama combination preparation processing section 23 as illustrated in a one-dot chain line are included as the functional configuration.

In the process of inputting a series of n pieces of panorama frame image data used for generating a panoramic image, the object information detecting section 20 detects object information on the respective pieces of panorama frame image data.

Moving object detection processing 202, and detection and recognition processing 203 are performed in this example.

The seam fixation processing section 21 performs processing (seam fixation processing 205) of obtaining the positions of m seams serving as joints between adjacent pieces of frame image data every (m+1) panorama frame image data groups (where m<n) in optimal position determination processing by using the object information detected by the object information detecting section 20, and fixing the m or less joints. This seam fixation processing 205 is sequentially performed in the process of inputting the series of n pieces of panorama frame image data.

The image combining section 22 combines the respective pieces of panorama frame image data on the basis of the seams fixed by the seam fixation processing section 21, and performs stitch processing 206 of generating panoramic image data in which the n pieces of panorama frame image data are used.

The panorama combination preparation processing section 23 performs, for example, pre-processing 200, image registration processing 201, and re-projection processing 204 as preparation processing necessary for accurate panorama combination.

The processing will be described.

An input image group to be subjected to the pre-processing 200 represents pieces of panorama frame image data FM#0, FM#1, FM#2 . . . sequentially acquired while a user is capturing a panoramic image with the image capturing device 100.

First of all, the panorama combination preparation processing section 23 performs the pre-processing 200 preceding the panorama combination processing on images (each piece of panorama frame image data) (which have been herein subjected to the same image processing as image processing performed when normal images are captured) captured in a panoramic image capturing operation of a user.

The input image has been affected by an aberration based on the characteristics of the lens unit 110. In particular, the distortion aberration of the lens negatively affects the image registration processing 201, and decreases the accuracy of alignment. Furthermore, an artifact occurs around a seam in a combined panoramic image, so that the distortion aberration is corrected in this pre-process 200. The correction of the distortion aberration advantageously increases the accuracy of the moving object detection processing 202 and the detection and recognition processing 203.

Next, the panorama combination preparation processing section 23 performs the image registration processing 201 on the frame image data subjected to the pre-processing 200.

It is necessary to convert pieces of panorama frame image data into coordinates in a single coordinate system for panorama combination, and this single coordinate system will be referred to as panoramic coordinate system.

Two consecutive pieces of panorama frame image data are input and aligned in the panorama coordinate system in the image registration processing 201. Information on the two pieces of panorama frame image data acquired in the image registration processing 201 is merely a relationship between the coordinates of the two images. However, if one of the coordinate systems of images (e.g. coordinate system of the first piece of panorama frame image data) is chosen and the chosen coordinate system is fixed as the panoramic coordinate system, the coordinate systems of all the pieces of panorama frame image data can be converted into the panoramic coordinate system.

Specific processing performed in the image registration processing 201 is roughly divided into two as follows:

1. Detecting local movement in an image, and
2. Obtaining the global movement of the whole image from the detected local movement information.

In the processing 1, the following is generally used:

Block matching, and

Feature point extraction and feature point matching such as Harris, Hessian, SIFT, SURF, and FAST.

In addition, the local vectors (local movement) of the feature points of the image are obtained.

A local vector group obtained in the processing 1 is used as an input in the processing 2, and the following robust estimation techniques are used:

Least square method,

M-Estimator,

Least median square (LMedS) method, and

RANdom SAmple Consensus (RANSAC).

A coordinate transformation matrix such as an affine transformation matrix and a projection transformation matrix (homography) optimal for describing a relationship between the coordinate systems of two pieces of frame image data is obtained. These kinds of information will be herein referred to as image registration information.

The image registration processing 201 in the present example or alignment processing on two target images (processing of aligning the two target images in a manner that a captured object remains consistent) will be specifically performed as follows.

First of all, as a precondition, the image registration processing 201 in the present example adopts the RANSAC as the robust estimation technique. Under this precondition, the following processing is executed to obtain image registration information indicating an optimal positional relationship between two images.

1) Detect feature points (such as edges) of two target images.
2) Compare (match) the feature points between the two images, and detect, as corresponding points, the feature points that can be considered to have the same feature amount (vector).
3) Acquiring the movement of the corresponding points between the two images, thereby detecting local movement.
4) Detect global movement (how the whole frame images move) from the local movement.
5) Obtain a coordinate transformation matrix indicating an optimal positional relationship between the two images (in which the captured object remains consistent) by using the robust estimation technique of the RANSAC. The robust estimation technique of the RANSAC then distinguishes a feature point serving as the background (inlier) from a feature point serving as the moving object (outlier).

The use of the coordinate transformation matrix obtained in this way and a camera parameter (internal parameter) such as focal distances of the two captured images makes it possible to obtain a coordinate transformation matrix between the two images for three-dimensional space.

The coordinate transformation matrix obtained in this way indicates a relative relationship between the two images, but introduces a given coordinate axis and defines an absolute coordinate system. This absolute coordinate system will be herein referred to as world coordinate system.

The coordinate transformation matrix in this world coordinate system is used as image alignment information.

The panorama combination preparation processing section 23 performs the re-projection processing 204.

All the pieces of panorama frame image data are projected onto a single plane surface or a single curved surface such as a cylindrical surface and a spherical surface in the re-projection processing 204 on the basis of the image registration information acquired in the image registration processing 201. At the same time, projection is performed on the same plane surface or curved surface on the basis of the moving object information and the detection and recognition information.

The re-projection processing 204 may be performed on the panorama frame image data on the basis of the optimization of pixel processing as processing preceding the stitch processing 206 or a part of the stitch processing 206. The re-projection processing 204 may be simply performed prior to the image registration processing 201 (e.g. as a part of the pre-process 200). More simply, the re-projection processing 204 does not have to be performed, but may be treated as an approximation of cylindrical projection processing.

The object information detecting section 20 performs the moving object detection processing 202, and the detection and recognition processing 203 on each piece of panorama frame image data subjected to the pre-processing 200.

Pieces of frame image data are combined as a characteristic of the panorama combination processing. Accordingly, a moving object in a captured scene causes a part of the moving object to be separated or blurred, resulting in image failure or degraded image quality. It is thus desirable to detect a moving object, and then decide a seam of the panorama avoiding the moving object.

Two or more consecutive pieces of panorama frame image data are input, and a moving object is detected in the moving object detection processing 202. Specifically, for example, if a differential value between pixels of the two pieces of panorama frame image data that have been actually aligned on the basis of the image registration information acquired in the image registration processing 201 is greater than or equal to a given threshold, the pixels are determined as a moving object.

Alternatively, characteristic point information determined as an outlier in the robust estimation in the image registration processing 201 may be used to make a determination.

Positional information on a human face or body, an animal, or the like in the captured frame image data is detected in the detection and recognition processing 203. People and animals are quite likely to be moving objects. Even if people and animals are not moving, a panoramic seam decided thereon more frequently feels visually strange than a seam decided on other objects. Accordingly, it is desirable to decide a seam avoiding these objects. That is to say, the information acquired in this detection and recognition processing 203 is used for supplementing information from the moving object detection process 202.

The image data from the re-projection processing 204, the image registration information from the image registration processing 201, the moving object information from the moving object detection processing 202, and the detection and recognition information from the detection and recognition processing 203 are used as inputs, and an appropriate seam SM (seams SM0 to SM(n-2) described with reference to FIGS. 2 and 3) that causes less failure in a panoramic image is decided in the seam fixation processing 205 performed by the seam fixation processing section 21.

First of all, a cost function for an overlapping area between adjacent pieces of panorama frame image data is defined from the input information in the seam decision processing 205.

For example, the total value acquired by suitably weighting each pixel in the overlapping area in accordance with each of the moving object information from the moving object detection processing 202 and the detection and recognition information from the detection and recognition processing 203 is used as a function value.

In this case, a higher cost function value means that more objects such as moving objects and human bodies are present on the point. Accordingly, a set of points having lower cost function values are used as a seam in order to maximally prevent failure in a panoramic image.

If n images are used for panoramic image combination, there are n-1 overlapping areas. Accordingly, n-1 cost functions are defined. A combination in which these n-1 cost functions are minimized is thus obtained in order to choose optimal seams as the whole panoramic image. This is generally referred to as combinatorial optimization problem, and the following solutions are known:

Methods for obtaining an exact solution
Branch and bound
Memoization
Dynamic programming
Graph cut
Methods for obtaining an approximate solution
Local search (hill climbing)
Simulated annealing
Tabu search
Genetic algorithm It is possible to obtain all the seams SM1 to SM(n-2) with any one of these methods.

All the seams SM1 to SM(n-2) decided in this way and the respective pieces of panorama frame image data FM#0 to FM#(n-1) are used to combine a final panoramic image in the stitch processing 206 performed by the image combining section 22.

Blend processing is performed on an area around the seam in order to improve the unnaturalness of the joint, while pixel values are simply copied for the other areas or the other areas are just re-sampled to the panorama coordinate system. In addition, all the images are bonded.

An unnecessary part of the combined image in the direction vertical to the sweep direction is finally trimmed on the basis of the amount of a camera shake, offering a wide angle panoramic image (panoramic image data PD) having the sweep direction as the long-side direction.

<3. Flow to Link>

[3-1. Overview]

An object of the present embodiment is to generate the panoramic image data PD that offers a strong sense of presence and immersion to a user without imposing too heavy a load on a user by using the image capturing device 100 configured as described above.

To this end, the present embodiment offers a technique of causing a device to automatically paste and integrate another piece of captured image data such as a moving image and a high resolution image to the panoramic image data PD. Specifically, other captured image data that is capable of aligning with the panoramic image data PD in a manner that a captured object remains consistent is pasted to the panoramic image data PD, and then the panoramic image data PD is presented.

The present embodiment relates to a technology of linking the other captured image data to be integrated to the panoramic image data PD under the precondition that the present embodiment adopts such a technique.

Generally, the following usage by users is conceivable for implementing the above-described technique.

First of all, let us assume, for example, a situation such as athletic meets and various sports watching in which a user shoots images at the same standing position. A user performs an operation of shooting a panoramic image and an image other than the panoramic image such as a moving image and a still image at the same standing position (same image capturing spot) in such a situation.

A large difference between a position for shooting a panoramic image and a position for shooting an image other than the panoramic image causes a disparity between the panoramic image and the other image, and makes the joint in the integrated images unnatural. The strictly defined the identity of the image capturing spots of the panoramic image and the other image means that the optical centers of the optical systems of image capturing devices that have captured those images agree with each other. However, even if there are, for example, some errors including an error caused by a camera shake, it is adequately possible to align the images as understood from the description of the panorama combination processing.

In view of this point, the image capturing spots for the panoramic image and the other image do not have to be strictly the same, but only have to be "substantially the same" enough for alignment.

Adopting the above-described usage allows the image capturing device 100 to acquire the panoramic image data PD and the other captured image data, to which image capturing spot data indicating substantially the same image capturing spots is attached.

Here, a moving image or a high resolution image is shot as the other captured image data in order to strengthen a sense of presence and immersion. Additionally, the high resolution image only has to have a resolution higher than at least the panoramic image data PD. Accordingly, the high resolution image can be defined as a still image shot at an angle of view which is on a telephoto side as compared to an angle of view at which the panoramic image data PD has been shot.

It is possible in the present example to shoot a so-called multi-zoom image as the high resolution image. That is to say, the multi-zoom image refers to a plurality of high resolution images shot at different angles of view (which is, however, on a telephoto side as compared to an angle of view at which the panoramic image has been shot).

A plurality of still images serving as the multi-zoom image are managed in the present example as a set of image groups. For example, the image capturing device 100 has an image shooting mode for shooting a multi-zoom image, and a user sets the image shooting mode and then performs an operation of shooting still images while sequentially changing the angle of view (zoom magnification). The image capturing device 100 (control section 108) manages pieces of captured image data sequentially generated along with this image capturing operation as a set of image group data serving as multi-zoom image data.

Figure 6:
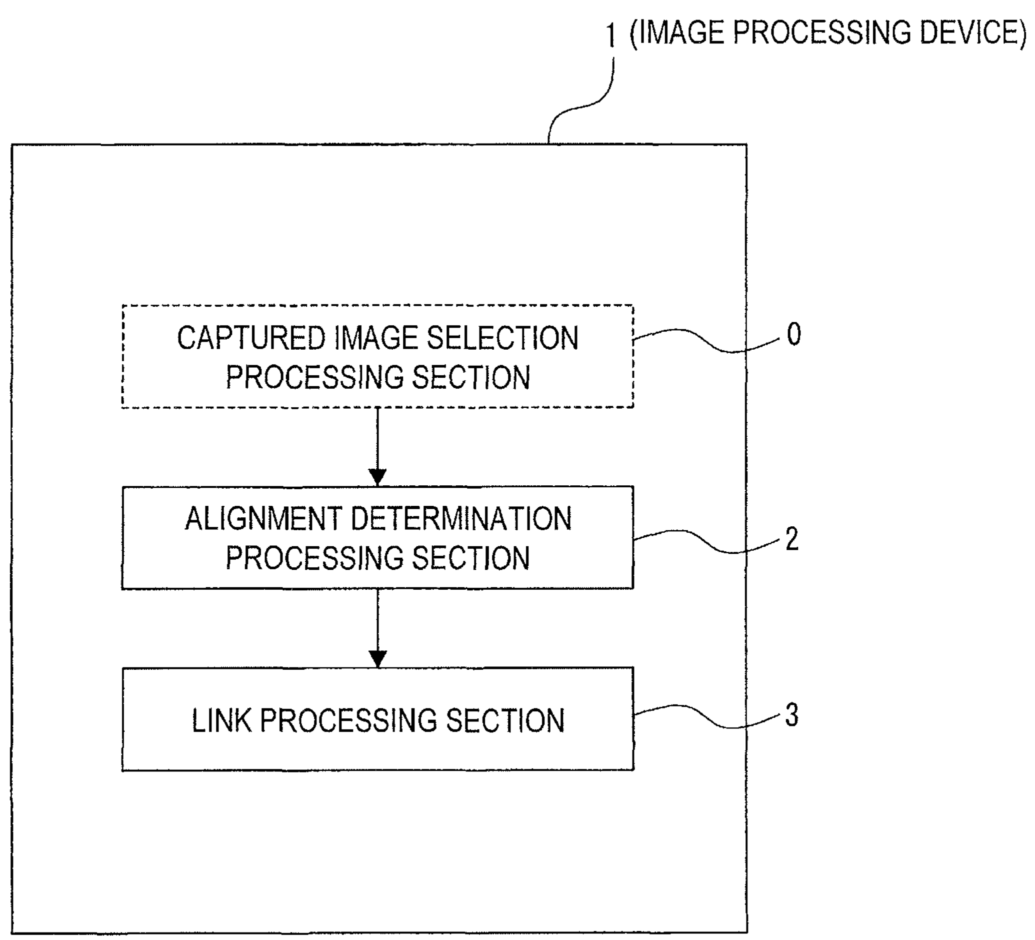
FIG. 6 is a diagram for describing an overview of processing performed until a panoramic image and another image are linked to each other.

FIG. 6 is a diagram for describing the overview of processing performed until a panoramic image and another image are linked to each other. FIG. 6 specifically illustrates processing performed by the image processing device 1 according to an embodiment as a functional configuration, and illustrates processing executed in the functional configuration component.

The image processing device 1 has at least a function of an alignment determination processing section 2 and a function of a link processing section 3.

The alignment determination processing section 2 performs processing of determining whether or not other captured image data than the panoramic image data PD is capable of aligning with the panoramic image data PD in a manner that a captured object remains consistent between the panoramic image data PD and the other captured image data.

The link processing section 3 performs processing (image link processing) of linking, to the panoramic image data PD, the other captured image data determined by the alignment determination processing section 2 to be capable of aligning with the panoramic image data PD.

It is desirable that the other captured image data to be processed by the alignment determination processing section 2 be selected in advance on the basis of a relationship with an image capturing spot for the panoramic image data PD. This is because it is not desirable from the perspective of an increased processing load that the alignment processing is performed on all the pieces of other captured image data than the panoramic image data PD.

Accordingly, the image processing device 1 according to the present example includes a captured image selection processing section 0 that selects the panoramic image data PD and the other captured image data to be subjected to the alignment determination processing from the captured image data recorded in the recording device 108 before the alignment determination processing section 2 performs the alignment determination processing.

The captured image selection processing section 0 according to the present example performs processing of selecting, from the captured image data recorded in the recording device, the panoramic image data PD and the other captured image data to which image capturing spot data indicating the same image capturing spots is attached. As discussed above, a criterion for determining the identity of image capturing spots is then set in accordance with whether or not alignment is possible.

Additionally, the captured image selection processing section 0 may be processing of causing a user to select the other captured image data captured at the same image capturing spot. Specifically, the image selection processing section 0 in this case becomes processing in which the control section 108 selects the panoramic image data PD and the other captured image data from the captured image data recorded in the recording device 108 on the basis of operation input information from the operation section 109.

Additionally, to prevent a processing load for the alignment determination processing from increasing, the captured image selection processing section 0 is not an essential component.

For example, if an image shooting mode is installed for generating a panoramic image into which another captured image is integrated, and the panoramic image data PD and the other captured image data captured while the image capturing mode is set are recognized as images to be processed by the alignment determination processing section 2, there is no need to perform the alignment determination processing on all the pieces of other recorded captured image data. Accordingly, it is also possible to prevent a processing load from increasing. In this way, the captured image selection processing section 0 is not an essential component, so that FIG. 6 illustrates the captured image selection processing section 0 in a dashed line for this reason.

[3-2. On Alignment Determination Processing]

The alignment determination processing performed by the alignment determination processing section 2 will be described in detail.

The alignment determination processing can have any specific processing content as long as it is determined whether or not the other captured image data is capable of aligning with the panoramic image data PD in a manner that a captured object remains consistent.

The image capturing device 100 has the alignment processing function as the image registration processing in the present example, so that it is determined with this alignment processing function whether or not the other captured image data is capable of alignment.

Specifically, the image registration processing is used in the present example to determine whether or not the other captured image data is capable of alignment as follows.

First of all, the image registration processing starts with the two images of the panoramic image data PD and the captured image data to be aligned with the panoramic image data PD.

It is first determined in this image registration processing whether or not the number of detected feature points is less than a predetermined value. If it is determined as a result that the number of detected feature points is less than the predetermined value, it is determined that the target captured image data is incapable of aligning with the panoramic image data PD.

The number of detected feature points less than the predetermined value means a uniform image poor in features. Thus, it is not possible to detect a proper corresponding point for such an image or to acquire adequate information on the movement of an object, so that the target captured image data is incapable of alignment.

To the contrary, if it is determined that the number of detected feature points is greater than or equal to the predetermined value, it is determined whether or not the number of detected corresponding points is less than a predetermined value. If it is determined as a result that the number of detected corresponding points is less than the predetermined value, it is determined that the target captured image data is incapable of aligning with the panoramic image data PD.

The number of detected corresponding points less than the predetermined value means that there are a few feature points which can be considered to be the same between the two target images. If there are a few corresponding points, it is not possible to acquire adequate information on the movement of an object. Accordingly, the target captured image data is incapable of alignment.

If it is determined that the number of detected feature points and the number of corresponding points are greater than or equal to the respective predetermined values, it is determined whether or not the number of detected inliers acquired in the process of the robust estimation of the RANSAC is less than a predetermined value. If the number of detected inliers is less than the predetermined value, it is determined that the target captured image data is incapable of aligning with the panoramic image data PD.

The number of detected inliers less than the predetermined value means that there are a few feature points which indicate the global movement (i.e. movement of the background), which is to be used as a criterion for alignment. Thus, such an image is incapable of alignment.

Let us assume in the present embodiment that the type of other captured image data which can be integrated with the panoramic image data PD can be divided into three types: moving image data, multi-zoom data, and data of a single still image.

Alignment determination techniques are changed in the present example in accordance with these types of other captured image data.

First of all, the moving image data will be described.

The moving image data requires a dynamic camerawork such as a pan, a tilt, and a zoom, so that the image registration processing is considerably difficult to perform on the moving image data. Moreover, the moving image data originally requires a large number of frame images, and a relatively large number of frame images are likely to fail to align with a panoramic image.

In view of this point, the following alignment determination technique is adopted for the moving image data.

That is to say, pieces of frame image data included in the moving image data are sequentially subjected to the alignment determination processing with respect to the panoramic image data PD in the above-described technique. It is then determined whether or not the number of consecutive pieces of frame image data (which will be described below as consecutive number count value FCcnt) determined to be incapable of alignment is greater than or equal to a predetermined threshold FCth. If it is determined that the consecutive number count value FCcnt is greater than or equal to the threshold FCth, it is determined that the whole of the moving image data is incapable of aligning with the panoramic image data PD.

Even if the consecutive number count value FCcnt is not greater than or equal to the threshold FCth, it is determined that the whole of the moving image data is incapable of aligning with the panoramic image data PD as long as the proportion of the number of pieces of frame image data (which will be described as a count value Fcnt) determined to be incapable of alignment to all the pieces of frame image data included in the moving image data is greater than or equal to a predetermined threshold Fth after the alignment determination on all the pieces of frame image data (the total number of frames will be represented below as J) is finished.

Meanwhile, the multi-zoom image requires relatively high alignment accuracy because users focus on enjoying high resolution images. Thus, as for the multi-zoom image, pieces of image data included in the multi-zoom image data are sequentially subjected to the alignment processing with respect to the panoramic image data in the above-described technique, and it is determined that the whole of the multi-zoom image data is incapable of aligning with the panoramic image data PD in the presence of any one piece of image data determined to be incapable of alignment.

As described above, the moving image data is less likely to have all the pieces of frame image data succeed in alignment, so that a low alignment determination criterion is set to facilitate the moving image to be integrated.

Meanwhile, the multi-zoom image, which is a high resolution image, requires a high alignment determination criterion to be set for accurate alignment. For confirmation, the moving image is likely to attract attention on a moving object in a frame and tolerates a minor alignment error, so that it is possible to set a low determination criterion as described above.

As for the data of a single still image, the alignment processing with respect to the captured panoramic image data is performed on still image data, and only still image data determined as a result to be capable of alignment is simply linked to the panoramic image data.

It is desirable that the data of a single still image be also captured as a high resolution image to strengthen a sense of presence and immersion when integrated. Thus, let us assume in the present example that still image data that is a high resolution image is used.

[3-3. On Link Processing]

When completed, the alignment determination processing offers a determination result indicating that each piece of other captured image data is capable/incapable of aligning with the panoramic image data PD.

The other captured image data determined in the alignment determination processing to be capable of aligning with the panoramic image data PD is linked to the panoramic image data PD in the link processing performed by the link processing section 3. Information indicating a link can take any specific form as long as it can be indicated that the panoramic image data PD and the other captured image data to which the information is attached are an image group capable of alignment.

As an example, a universally unique identifier (UUID) is used as the link information in the present embodiment. Specifically, one UUID is generated for each piece of panoramic image data to be subjected to the alignment determination processing, and the generated UUID is added to the piece of panoramic image data PD and a piece of other captured image data determined to be capable of aligning with the piece of panoramic image data PD.

Figure 7:
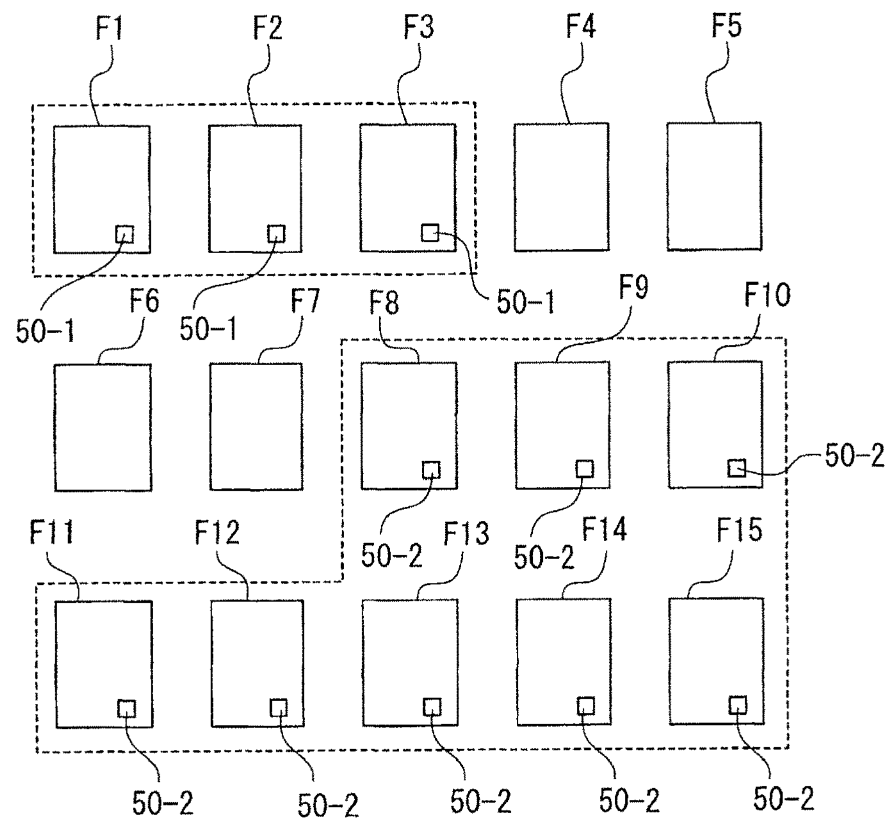
FIG. 7 is an explanatory diagram of a specific instance of addition of link information.

As a specific instance of the addition of the link information, a UUID 50 is embedded into each piece of image data (image file) as meta information, for example, as illustrated in FIG. 7A. FIG. 7A illustrates a case where the two pieces of panoramic image data PD are subjected to the alignment processing, and two types of UUID 50 are generated: a UUID 50-1 and a UUID 50-2. In the example of the figure, image files F1 to F3 are treated as an image group including the panoramic image data PD and other captured image data determined to be capable of aligning with the panoramic image data PD, while image files F8 to F15 are treated as an image group including the other panoramic image data PD and other captured image data determined to be aligning with the panoramic image data PD. In this case, the UUID 50-1 is embedded into and linked to the image files F1 to F3. Meanwhile, the UUID 50-2 is embedded into and linked to the image files F8 to F15.

Alternatively, as illustrated in FIG. 7B, the link information can also be implemented as management information for managing an image group determined to be capable of alignment.

Specifically, the example of FIG. 7B shows an instance of the link in the form of management information in which information on an image file name is associated with each UUID 50.

When the alignment determination processing is performed, the alignment processing is executed as the image registration processing in the present embodiment. Accordingly, it is possible to acquire alignment information (coordinate transformation matrix in the world coordinate system) on the other image data determined to be capable of alignment with respect to the panoramic image data. This alignment information is also added in the present embodiment to the other captured image data determined to be capable of alignment. A specific technique of adding the alignment information is not limited in particular, but it is possible to adopt a technique of embedding the alignment information into an image file as meta data, for example, in the same way as the link information, and a technique of managing the alignment information in association with the UUID 50.

When an image that serves as the moving image or the multi-zoom image and includes a plurality of still images is integrated, each included image requires alignment information. Accordingly, the alignment information is added to each image included in the moving image or the multi-zoom image.

If the above-described alignment determination technique is adopted, the moving image also includes a frame image determined to be incapable of alignment. Alignment information based on alignment information on a frame image determined to be capable of alignment is possible may be added to the frame image that does not have alignment information in this way.

Specifically, for example, it is conceivable that alignment information on a frame image determined to be capable of alignment at least before or after a frame image determined to be incapable of alignment is complemented and used. Alternatively, it is possible to use alignment information, as it is, on a frame image determined to be capable of alignment at least before or after a frame image determined to be incapable of alignment.

<4. Processing Procedure>

The procedure of specific processing to be executed for implementing the image processing according to the present embodiment as described above will be described with reference to FIGS. 8 to 10.

Figure 8:
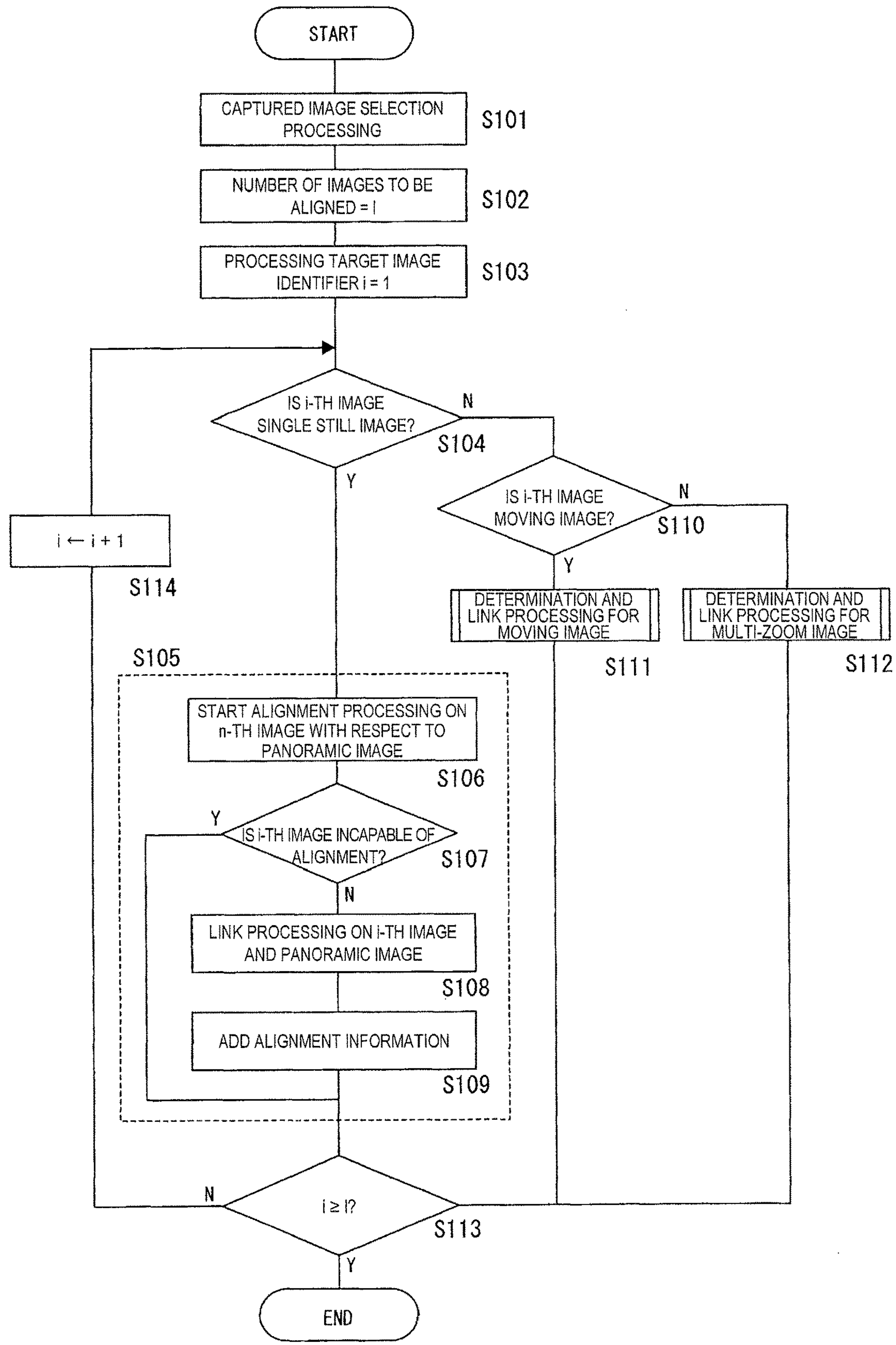
FIG. 8 is a flowchart for describing a procedure of specific processing to be executed in order to implement image processing according to an embodiment.
Figure 9:
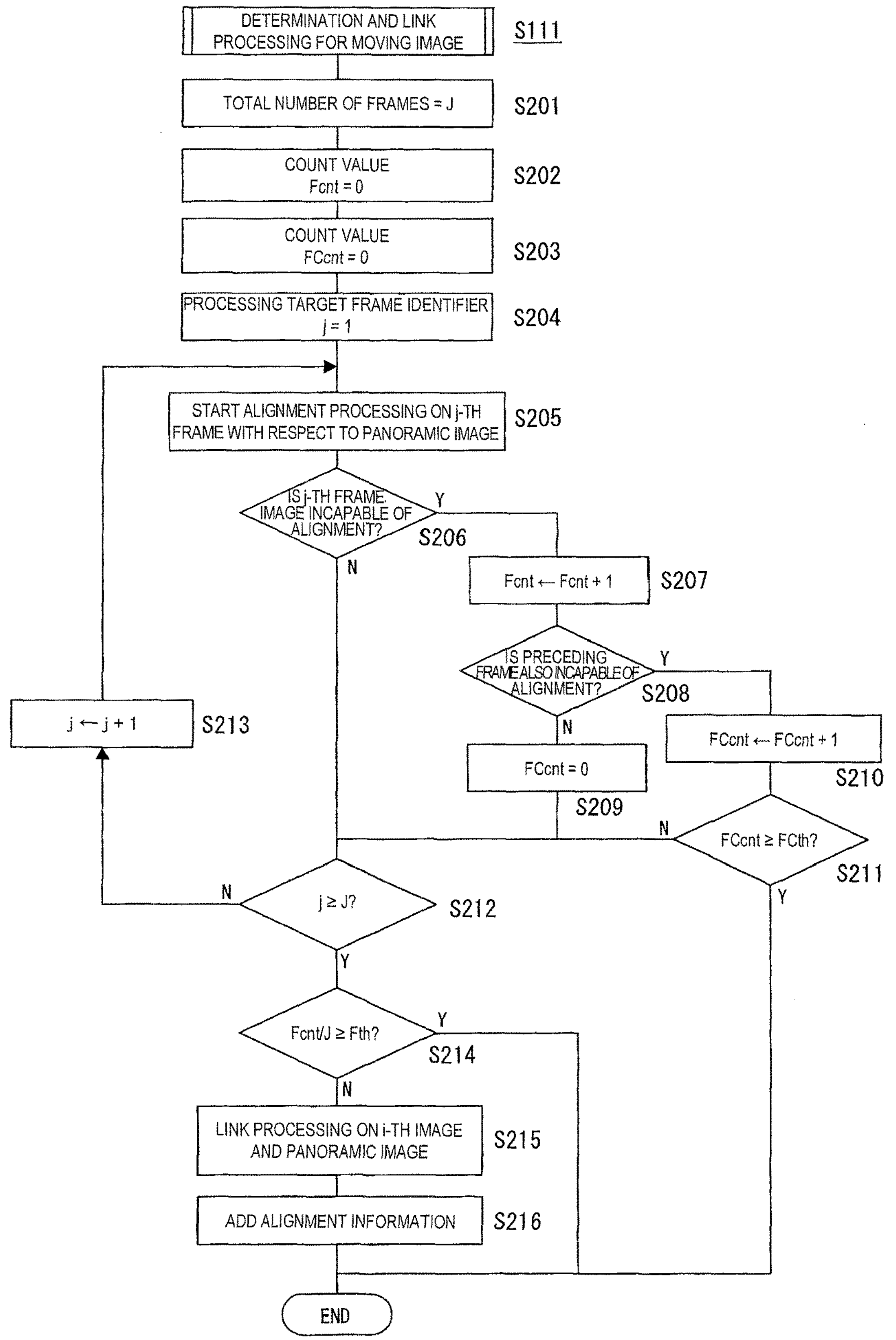
FIG. 9 is a flowchart illustrating a procedure of processing to be executed as determination and link processing for a moving image.
Figure 10:
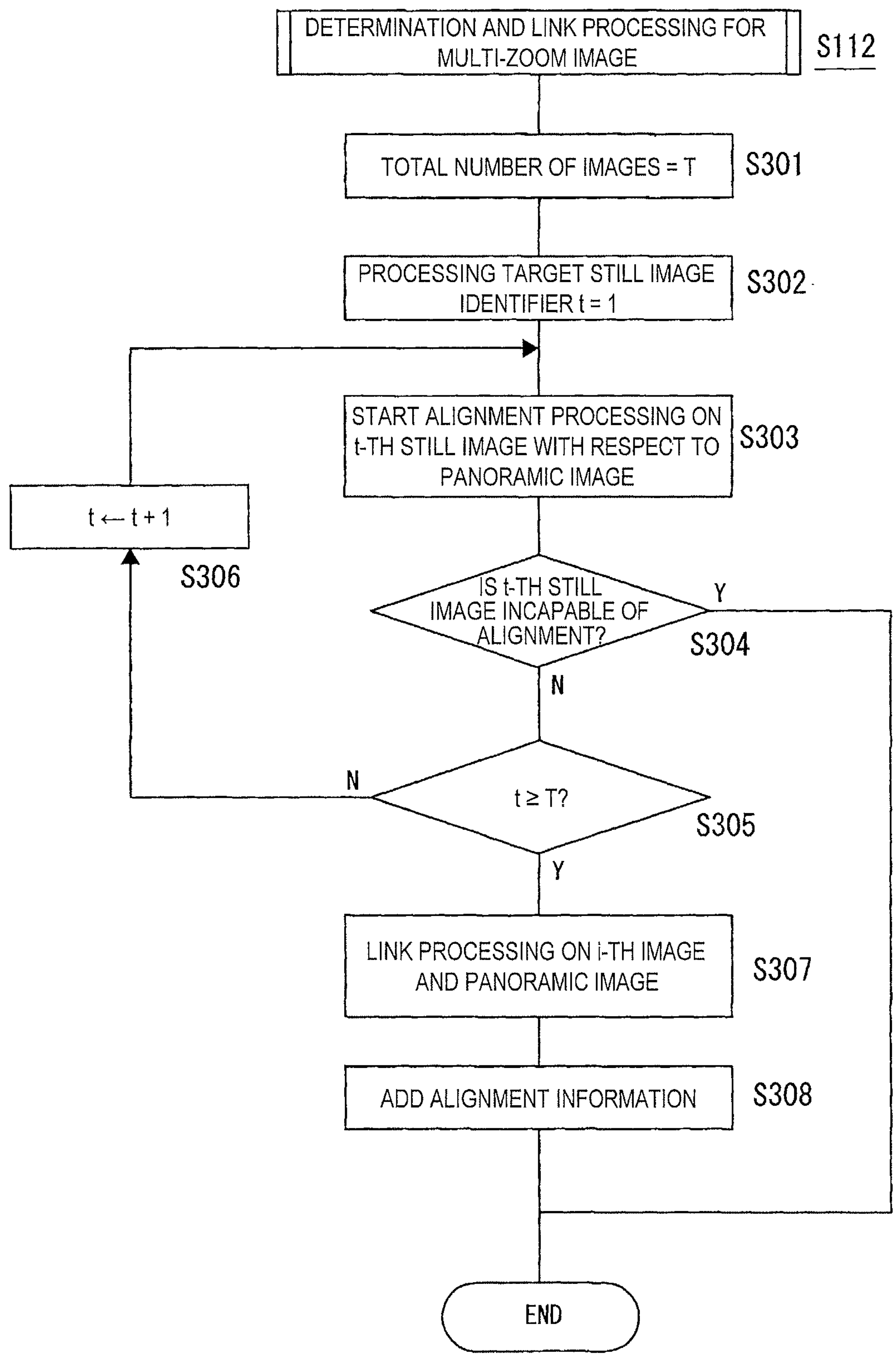
FIG. 10 is a flowchart illustrating a procedure of processing to be executed as determination and link processing for a multi-zoom image.

FIGS. 8 to 10 each illustrate a flowchart in which several control elements are added to processing elements executed chiefly by each functional configuration illustrated in FIG. 6. The processing elements already described with reference to FIG. 6 are denoted with the same reference numerals in the processing illustrated in FIGS. 8 to 10, and will not be repeatedly described in detail.

In the following description, the "alignment processing" is executed by the alignment processing section 102A of the image processing section 102. The other processing may be executed by any of the image processing section 102 and the control section 108. As a specific example, captured image selection processing (S101) is executed by the control section 108, and the other processing is all executed by the image processing section 102 in the present example.

In step S101 in FIG. 8, the captured image selection processing is performed. That is to say, captured image data to be subjected to the alignment determination processing is selected. As discussed above, the processing of selecting captured image data here can be interpreted as processing for the image capturing device 100 to proactively select captured image data on the basis of image capturing spot data attached to the panoramic image data PD and the other captured image data, or processing of selecting image data on the basis of operation input information from the operation section 109 to cause a user to select an image captured at substantially the same spot.

In step S102, the number of images to be aligned=I is set. As the value of the number I of images to be aligned, the number of pieces of other captured image data than the panoramic image data PD selected in the selection processing in step S101 is set.

Next, in step S103, a processing target image identifier i=1 is set. This processing target image identifier i is information for identifying the other captured image data to be subjected to the alignment determination processing. In step S103, the processing target image identifier i=1 is set, thereby setting captured image data having i=first among the I pieces of other captured image data selected in step S101 as image data to be subjected to the alignment determination processing.

Next, in step S104, it is determined whether or not an i-th image is data of a single still image.

If an affirmative result is acquired indicating that the i-th image is data of a single still image, determination and link processing for a single still image denoted with step S105 and enclosed by a dashed line in the figure is executed.

That is to say, the alignment processing on the i-th image with respect to a panoramic image first starts in step S106, and then in step S107, it is determined whether or not the i-th image is capable of alignment. As discussed above, it is determined in the present example whether or not the i-th image is incapable of alignment, on the basis of the number of detected feature points, corresponding points, and inliers acquired in the process of the alignment processing.

If a negative result is acquired in step S107 indicating that the i-th image is not incapable of alignment, the link processing is executed in step S108 on the i-th image and the panoramic image. Furthermore, in step S109, addition processing is executed on the alignment information. That is to say, the alignment information acquired as a result of the alignment processing that started in step S106 is added to the i-th image (data of a single still image in this case). After the addition processing is performed in step S109, the processing proceeds to step S113.

To the contrary, if an affirmative result is acquired in step S107 indicating that the i-th image is capable of alignment, the processing proceeds to step S113 without going through the link processing in step S108 and the addition processing in step S109.

In step S113, it is determined whether or not the value of the processing target image identifier i is greater than or equal to the value of the number I of images to be aligned. If an affirmative result is acquired indicating that the value of the processing target image identifier i is greater than or equal to the value of the number I of images to be aligned, it is meant that processing on all processing target images has been already completed. Thus, in that case, the image processing according to the present embodiment is finished.

To the contrary, if a negative result is acquired indicating that the value of the processing target image identifier i is not greater than or equal to the value of the number I of images to be aligned, the value of the processing target image identifier i is increased (i←i+1) in step S114, and then the processing returns to step S104 to continue processing on the remaining images.

If a negative result is acquired in step S104 indicating that the i-th image is not data of a single still image, it is determined in step S110 whether or not the i-th image is a moving image.

If an affirmative result is acquired indicating that the i-th image is a moving image, the determination and link processing for a moving image is executed in step S111, and then the processing proceeds to step S113 described above.

To the contrary, if an affirmative result is acquired indicating that the i-th image is a moving image, the determination and link processing for a multi-zoom image is executed in step S112, and then the processing proceeds to step S113 in the same way.

FIG. 9 illustrates the procedure of processing to be executed as the determination and link processing for a moving image in step S111.

First of all, in step S201 in FIG. 9, the total number of frames=J is set. That is to say, the total number of pieces of frame image data included in the moving image data serving as the i-th image is set as the value of the total number J of frames.

Next, in step S202, the count value Fcnt for the number of frames incapable of alignment is reset as 0, and in step S203, the count value FCcnt for the number of consecutive frames incapable of alignment is further reset as 0.

In addition, in step S204, the processing target frame identifier i=1 is set, and the alignment processing on a j-th frame with respect to the panoramic image starts in step S205.

Next, in step S206, it is determined whether or not the j-th frame image is incapable of alignment.

If an affirmative result is acquired indicating that the j-th frame image is incapable of alignment, processing for the count values Fcnt and FCcnt is executed in steps S207 to S211.

Specifically, the j-th frame image is a frame image incapable of alignment, so that the count value Fcnt is increased (Fcnt←Fcnt+1) in step S207.

Next, in step S208, it is determined whether or not the preceding frame (i.e. j-1-th frame) is also incapable of alignment. If a negative result is acquired indicating that the preceding frame is not incapable of alignment, the processing proceeds to step S209 to reset the count value FCcnt as 0, and then the processing proceeds to step S212. That is to say, the consecution of frames incapable of alignment is stopped, so that FCcnt is reset as 0.

To the contrary, if an affirmative result is acquired indicating that the preceding frame is also incapable of alignment, the processing proceeds to step S210 to increase the count value FCcnt (FCcnt←FCcnt+1).

Next, in step S211, it is determined whether or not the count value FCcnt is greater than or equal to the threshold FCth. If a negative result is acquired indicating that the count value FCcnt is not greater than or equal to the threshold FCth, the processing proceeds to step S212. To the contrary, if an affirmative result is acquired indicating that the count value FCcnt is greater than or equal to the threshold FCth, the determination and link processing illustrated in this figure is finished. That is to say, as a result, moving image data having the number of consecutive frames incapable of alignment greater than or equal to the predetermined value is not linked to the panoramic image data PD.

If a negative result is acquired in step S206 indicating that the j-th frame image is not incapable of alignment, the processing proceeds to step S212 without going through the processing in steps S207 to S211.

In step S212, it is determined whether or not the value of a processing target frame identifier j is greater than or equal to the value of the total number J of frames. If a negative result is acquired indicating that the value of the processing target frame identifier j is not greater than or equal to the value of the total number J of frames, the value of the processing target frame identifier j is increased (j←j+1) in step S213, and then the processing returns to step S205. Accordingly, the processing following step S205 described above is executed on the next frame image.

To the contrary, if an affirmative result is acquired in step S212 indicating that the value of the processing target frame identifier j is greater than or equal to the value of the total number J of frames, the processing proceeds to step S214 to determine whether or not Fcnt/J≥Fth is satisfied. That is to say, it is determined whether or not a proportion of the number (Font) of frame images determined to be incapable of alignment to the total number (J) of frames is greater than or equal to the predetermined value Fth in the moving image data serving as the i-th image.

If a negative result is acquired in step 5214 indicating that Fcnt/J≥Fth is not satisfied, the processing proceeds to step S215 to execute the link processing on the i-th image (i.e. image file serving as the moving image data in this case) and the panoramic image.

In step S216, the addition processing is then executed on the alignment information. That is to say, the alignment information acquired on the basis of the alignment processing is added to each piece of frame image data included in the moving image data serving as the i-th image.

Additionally, alignment information based on alignment information acquired for a frame image that has succeeded in alignment is added to a frame image (determined to be incapable of alignment) that has failed to align with the panoramic image as discussed above.

If the moving image data has the number of consecutive frames incapable of alignment greater than or equal to the predetermined value, or if the proportion of the number of frames incapable of alignment to the total number of frames is greater than or equal to the predetermined value in the moving image data, it is determined in the above-described processing that the whole of the moving image data is incapable of aligning with the panoramic image data PD, and the moving image data is not linked to the panoramic image data PD.

FIG. 10 illustrates the procedure of processing to be executed as the determination and link processing for a multi-zoom image in step S112.

First of all, in step S301, the total number of images is set as T. That is to say, the value of the total number T of images is set as the total number of pieces of still image data included in the multi-zoom image data as the i-th image.

In addition, in step S302, the processing target still image identifier t=1 is set, and the alignment processing on a t-th still image with respect to the panoramic image starts in step S303.

Next, in step S206, it is determined whether or not the t-th still image is incapable of alignment.

If an affirmative result is acquired indicating that the t-th still image is incapable of alignment, the determination and link processing illustrated in this figure is finished. Accordingly, if the multi-zoom image includes any one still image incapable of alignment, it is determined that the whole of the multi-zoom image is incapable of aligning with the panoramic image data, and the multi-zoom image is not linked to the panoramic image data PD.

To the contrary, if a negative result is acquired in step S304 indicating that the t-th still image is not incapable of alignment, the processing proceeds to step S305 to determine whether or not the value of the processing target still image identifier t is greater than or equal to the value of the total number T of images. If a negative result is acquired indicating that the value of the processing target still image identifier t is not greater than or equal to the value of the total number T of images, the value of the processing target still image identifier t is increased (t←t+1) in step S306, and then the processing returns to step S303. Accordingly, the alignment determination processing is repeatedly executed until the T-th still image is reached as long as a still image capable of alignment is available.

If an affirmative result is acquired in step S305 indicating that the value of the processing target still image identifier t is greater than or equal to the value of the total number T of images, the link processing is executed in step S307 on the i-th image and the panoramic image. That is to say, all the pieces of still image data (image files) included in the multi-zoom image data serving as the i-th image are linked to the panoramic image data PD.

In step S308, the addition processing is executed on the alignment information. That is to say, the alignment information acquired as a result of the alignment processing executed on individual pieces of still image data included in the multi-zoom image data serving as the i-th image is added to the individual pieces of still image data.

<5. Conclusion>

As described above, it is determined in the present embodiment whether or not other captured image data than the panoramic image data PD is capable of aligning with the panoramic image data PD in a manner that a captured object remains consistent between the panoramic image data PD and the other captured image data, and the other captured image data determined to be capable of aligning with the panoramic image data PD is linked to the panoramic image data PD.

This allows the other captured image data determined to be capable of aligning with the panoramic image data PD to be linked to the panoramic image data PD.

As a result, in order to integrate a captured image such as a moving image and a high resolution image other than a captured panoramic image and to generate a panoramic image that offers a strengthened sense of presence and immersion, a user only has to shoot a panoramic image and another captured image at substantially the same image capturing spot. Thus, it is possible to generate a panoramic image that offers a stronger sense of presence and immersion to a user without imposing too heavy a load on a user.

In the present embodiment, the other captured image data includes any of moving image data and still image data serving as high resolution image data captured at an angle of view which is on a telephoto side as compared to a set angle of view for capturing a panoramic image of the panoramic image data PD.

A moving image or a high resolution image is preferable for integration into a captured panoramic image to strengthen a sense of presence and immersion. Thus, it is possible to more reliably generate a panoramic image that offers a strong sense of presence and immersion.

Furthermore, alignment determination techniques are changed in the present embodiment in accordance with the image type of the other captured image data.

This allows an appropriate alignment determination technique to be used in accordance with the image type.

Moreover, the alignment determination is made on the moving image data on a determination criterion lower than the determination criterion of the still image data in the present embodiment.

As discussed above, characteristically, he moving image data is likely to include a relatively large number of frame images that fail in alignment. Thus, setting a low alignment determination criterion for the moving image data allows an alignment determination to be made on a determination criterion according to the characteristics of the moving image data.

Specifically, if it is consecutively determined that a predetermined number of pieces of frame image data or more are incapable of alignment, or if the proportion of the number of the pieces of frame image data determined to be incapable of alignment to the total number of frames is greater than or equal to a predetermined value, it is determined in the present embodiment that the whole of the moving image data is incapable of aligning with the captured panoramic image data.

This allows an alignment determination on the moving image to be made with a proper determination criterion based on the number of consecutive frame images incapable of alignment and the proportion to the total number of frames.

If the other captured image data is the multi-zoom image data, it is determined whether or not each piece of still image data included in the multi-zoom image data is capable of aligning with the panoramic image data PD, and a piece of still image data determined to be incapable of alignment is not linked to the panoramic image data PD in the present embodiment.

As discussed above, the multi-zoom image requires relatively high alignment accuracy because users focus on enjoying high resolution images. Thus, a still image determined to be incapable of alignment in the above-described way is not linked, thereby satisfying the requirement of the alignment accuracy with respect to a high resolution image.

Furthermore, if the multi-zoom image data includes still image data determined to be incapable of alignment as a result of an alignment determination on each piece of still image data included in the multi-zoom image data, it is determined in the present embodiment that the whole of the multi-zoom image data is incapable of aligning with the panoramic image data PD. That is to say, unless it is determined that all the still images included in the multi-zoom image are capable of alignment, none of the still images are linked to the panoramic image data even in the presence of a still image capable of alignment.

If only still images included in the multi-zoom image and determined to be capable of alignment were linked to and integrated into the panoramic image data PD, a difference in zoom level would become larger when the integrated parts in the multi-zoom image are multi-zoomed. Meanwhile, if it is determined in the presence of a still image determined to be incapable of alignment that the whole of the multi-zoom image is incapable of alignment as described above (i.e. the whole of the multi-zoom image is not linked to the panoramic image data PD unless all the still images are capable of alignment), it is possible to prevent such a difference in zoom level.

Moreover, it is determined in the alignment determination processing in the present embodiment whether or not two target images are capable of alignment, on the basis of a result acquired by executing the image registration processing of detecting feature points and corresponding points in the two target images, detecting local and global movement on the basis of the coordinates of the detected corresponding points, and detecting an optimal positional relationship between the two images in the robust estimation method.

Accordingly, the alignment processing is performed as the image registration processing in the alignment determination processing.

Thus, there is no need to separately perform the alignment processing in order to acquire alignment information necessary for integration with a panoramic image.

If an image capturing device that has a panorama combining function like the image capturing device 100 executes the alignment determination processing, the alignment processing section installed for the panorama combining function can also be used for the alignment determination processing. Thus, there is no need to separately install the alignment processing section for the alignment determination processing.

In addition, it is determined in the present embodiment that captured image data having the number of detected feature points determined to be less than the predetermined value is incapable of alignment.

As discussed above, the number of detected feature points less than the predetermined value means a uniform image poor in features. Thus, as described above, determining that captured image data having the number of detected feature points determined to be less than the predetermined value is incapable of alignment makes it possible to make a proper alignment determination.

In addition, it is determined in the present embodiment that captured image data having the number of detected corresponding points determined to be less than the predetermined value is incapable of alignment.

As discussed above, the number of detected corresponding points less than the predetermined value means that there are a few feature points which can be considered to be the same between the two images. Thus, as described above, determining that captured image data having the number of detected corresponding points determined to be less than the predetermined value is incapable of alignment makes it possible to make a proper alignment determination.

Furthermore, it is determined in the present embodiment that captured image data having the number of detected inliers acquired in the process of the robust estimation processing of the RANSAC less than the predetermined value is incapable of alignment.

The number of detected inliers less than the predetermined value means that there are a few feature points which indicate the global movement (i.e. movement of the background), which is to be used as a criterion for alignment. Thus, as described above, determining that captured image data having the number of detected inliers determined to be less than the predetermined value is incapable of alignment makes it possible to make a proper alignment determination.

Moreover, processing of selecting the panoramic image data PD and the other captured image data to be processed in the alignment determination processing is performed in the present embodiment.

Accordingly, only the determination processing has to be performed on the panoramic image data PD and the other captured image data selected in such selection processing in the alignment determination processing. That is to say, it is possible to lighten a processing load for the alignment determination processing.

The alignment information with respect to the panoramic image data PD is added in the present embodiment to the other captured image data determined to be capable of alignment.

The alignment information is required to integrate the panoramic image data PD and the other captured image data (to paste the other captured image data to the panoramic image data PD and reproduce them). Accordingly, attaching the alignment information in accordance with a result of the alignment determination processing allows the integrator (reproducer) to acquire the alignment information without separately performing the alignment processing, lightening a processing load on the integrator.

<6. Program>

A program according to an embodiment causes an information processing device to execute the alignment determination processing of determining whether or not other captured image data than captured panoramic image data is capable of aligning with the captured panoramic image data in a manner that a captured object remains consistent between the captured panoramic image data and the other captured image data, and the image link processing of linking, to the captured panoramic image data, the other captured image data determined in the alignment determination processing to be capable of aligning with the captured panoramic image data.

Specifically, for example, the program causes an information processing device serving as the image processing section 102, the control section 108, and the like to execute the processing described with reference to FIGS. 8 to 10.

It is possible to record in advance the program according to an embodiment, for example, in a hard disk drive (HDD) serving as a recording medium built in the image capturing device 100, and another information processing device and image processing device, or ROM in a microcomputer including a CPU.

Alternatively, the program can also be temporarily or permanently stored (recorded) in a removable recording medium such as a flexible disc, compact disc read only memory (CD-ROM), a magnet optical (MO) disc, a digital versatile disc (DVD), a magnetic disk, and semiconductor memory.

Such a removable recording medium can be provided as so-called package software. Providing the program, for example, through CD-ROM or DVD-ROM allows an information processing device such as a personal computer to install the program and to execute the alignment determination processing and the image link processing described above.

Additionally, the program can not only installed from the removable recording medium, but also downloaded from a download site via a network such as a local area network (LAN) and the Internet.

Installing the program in this way allows, for example, a general-purpose personal computer (PC) to function as the image processing device according to the present technology.

The program or a recording medium having the program recorded thereon makes it possible to easily implement an image processing device that attains the above-described advantageous effects.

<7. Modification>

Additionally, the present technology should not be limited to the specific examples described above, but a variety of modifications are possible.

For example, it has been described so far that the image capturing device 100 serves as both a device that generates the panoramic image data PD and the other captured image data and a device that performs the alignment determination processing on those pieces of image data, but the same device does not necessarily have to generate (capture) the panoramic image data PD and the other captured image data to be subjected to the alignment determination processing and to execute the alignment determination processing in itself. Specifically, for example, it is possible to transfer the panoramic image data PD and the other captured image data generated by the image capturing device 100 to another computer device 70 such as a PC, and to cause the computer device 70 to execute the alignment determination processing and the image link processing on the transferred panoramic image data PD and other captured image data.

Figure 11:
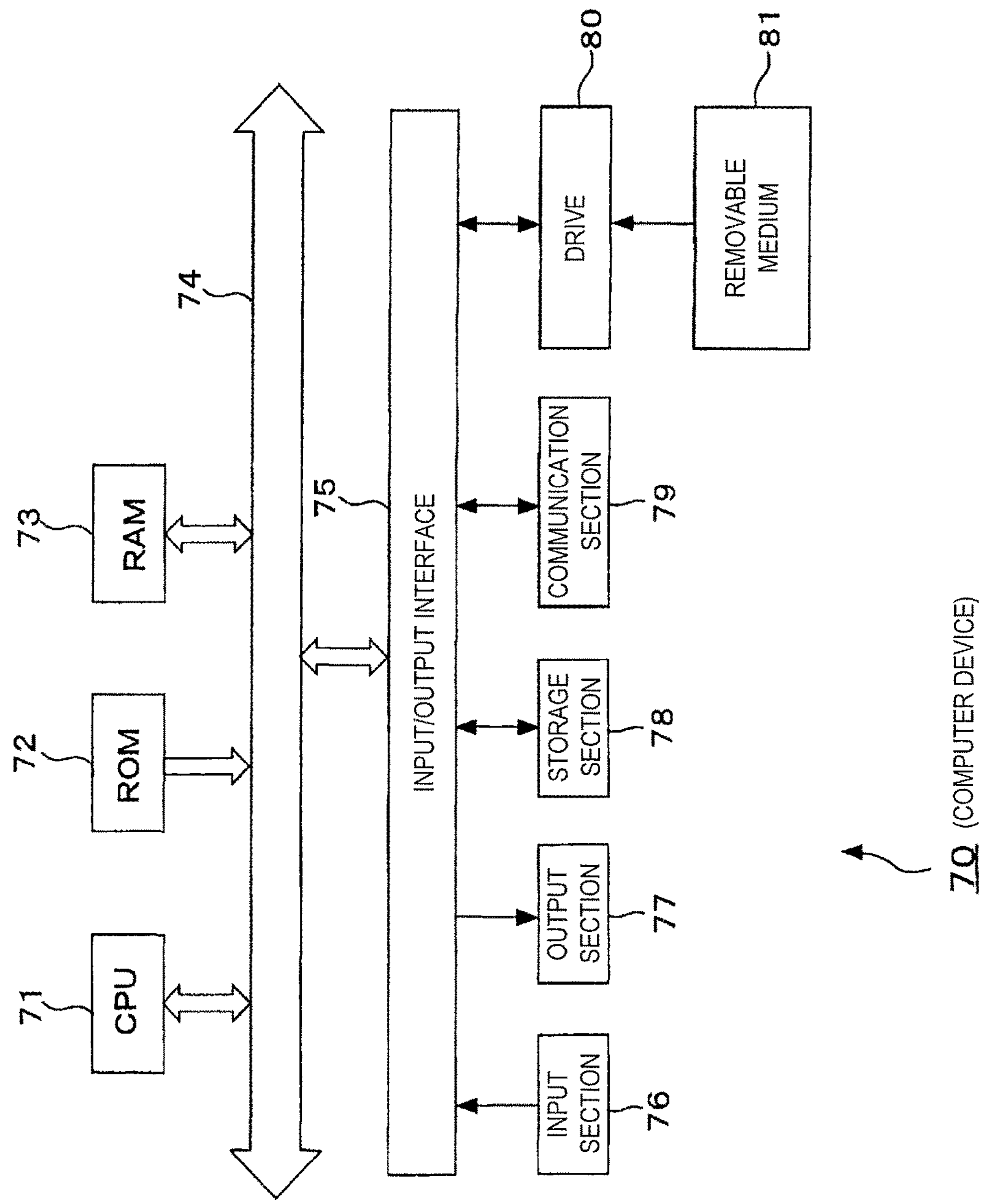
FIG. 11 is a diagram illustrating a configuration example of a computer device that executes alignment determination processing and image link processing.

FIG. 11 is a diagram illustrating a configuration example of the computer device 70 that executes the alignment determination processing and the image link processing.

FIG. 11 illustrates that a CPU 71 of the computer device 70 executes various kinds of processing in accordance with a program stored in ROM 72 or a program loaded from a storage section 78 to RAM 73. The RAM 73 stores, as required, data or the like necessary for the CPU 71 to execute various kinds of processing.

The CPU 71, the ROM 72, and the RAM 73 are connected to each other via a bus 74. This bus 74 is also connected to an input/output interface 75.

The input/output interface 75 is connected to an input section 76 including a keyboard and a mouse, a display including a cathode ray tube (CRT), an LCD, or an organic EL panel, an output section 77 including a speaker, the storage section 78 including a hard disk, and a communication section 79 including a modem. The communication section 79 performs communication processing via a network including the Internet.

The input/output interface 75 is connected, as needed, to a drive 80 and has a removable medium 81 such as a magnetic disk, an optical disc, or semiconductor memory mounted thereon as required. The panoramic image data PD and the other captured image data read out therefrom are stored in the storage section 78.

In this case, the program for executing the alignment determination processing and the image link processing is installed from a network or a recording medium.

Operating the CPU 71 in accordance with this program allows the alignment determination processing and the image link processing to be implemented.

Additionally, for example, a server device in cloud computing serves as the computer device 70 in some cases.

It has been determined so far that the whole of the multi-zoom image is capable of aligning with the panoramic image only when it is determined that all the still images included in the multi-zoom image are capable of alignment. That is to say, only when it is determined that all the still images included in the multi-zoom image are capable of alignment, the multi-zoom image is linked to the panoramic image.

However, instead, if there is any one still image determined to be capable of alignment, the link processing can be performed on the still image alone.

In the present technology, among still images included in the multi-zoom image, at least a still image determined to be incapable of alignment is not linked to the panoramic image. This can satisfy the requirement of the alignment accuracy of a high resolution image as discussed above.

It has been described so far that the alignment processing (image registration processing) is executed and the alignment determination processing is executed on the basis of information acquired in the process thereof. However, it is possible to determine whether or not captured image data is capable of aligning with panoramic image data, even without executing the alignment processing in itself.

The present technology can be preferably applied to panoramic image data generated by capturing so-called a multi rows image.

<8. Present Technology>

Additionally, the present technology may also be configured as below.

(1)

An image processing device including:

an alignment determination processing section configured to determine whether or not other captured image data than captured panoramic image data is capable of aligning with the captured panoramic image data in a manner that a captured object remains consistent between the captured panoramic image data and the other captured image data; and an image link processing section configured to link, to the captured panoramic image data, the other captured image data determined by the alignment determination processing section to be capable of aligning with the captured panoramic image data.

(2)

The image processing device according to (1), wherein the other captured image data includes any of moving image data and still image data that serves as high resolution image data captured at an angle of view which is on a telephoto side as compared to a set angle of view for capturing a panoramic image of the captured panoramic image data.

(3)

The image processing device according to (2), wherein the alignment determination processing section changes determination techniques in accordance with an image type of the other captured image data.

(4)

The image processing device according to (3), wherein the other captured image data includes both the moving image data and the still image data, and wherein the alignment determination processing section determines the moving image data on a determination criterion lower than a determination criterion of the still image data.

(5)

The image processing device according to (4), wherein, when it is consecutively determined that a predetermined number of pieces of frame image data or more are incapable of alignment, or when a proportion of a number of the pieces of frame image data determined to be incapable of alignment to a total number of frames is greater than or equal to a predetermined value, the alignment determination processing section determines that a whole of the moving image data is incapable of aligning with the captured panoramic image data.

(6)

The image processing device according to any of (1) to (4), wherein the other captured image data includes multi-zoom image data including pieces of still image data captured at a plurality of angles of view which is on a telephoto side as compared to a set angle of view for capturing a panoramic image of the captured panoramic image data, wherein, when the other captured image data is the multi-zoom image data, the alignment determination processing section determines whether or not each piece of still image data included in the multi-zoom image data is capable of aligning with the captured panoramic image data, and wherein the link processing section does not link, to the captured panoramic image data, the piece of still image data determined by the alignment determination processing section to be incapable of aligning with the captured panoramic image data.

(7)

The image processing device according to (6), wherein the alignment determination processing section determines whether or not each piece of still image data included in the multi-zoom image data is capable of aligning with the captured panoramic image data, and determines that a whole of the multi-zoom image data is incapable of aligning with the captured panoramic image data in presence of the piece of still image data determined as a result to be incapable of aligning with the captured panoramic image data.

(8)

The image processing device according to any of (1) to (7), wherein the alignment determination processing section determines whether or not two target images are capable of aligning with each other, on the basis of a result acquired by executing image registration processing of detecting feature points and corresponding points in the two target images, detecting local and global movement on the basis of coordinates of the detected corresponding points, and detecting an optimal positional relationship between the two images in a robust estimation method.

(9)

The image processing device according to (8), wherein the alignment determination processing section determines that captured image data having a number of the detected feature points less than a predetermined value is incapable of alignment.

(10)

The image processing device according to (8) or (9), wherein the alignment determination processing section determines that captured image data having a number of the detected corresponding points less than a predetermined value is incapable of alignment.

(11)

The image processing device according to any. of (8) to (10), wherein the alignment determination processing section performs robust estimation processing of an RANSAC in the image registration processing, and determines that captured image data having a number of detected inliers acquired in a process of the robust estimation processing less than a predetermined value is incapable of alignment.

(12)

The image processing device according to any of (1) to (11), further including:

a selection processing section configured to select the captured panoramic image data and the other captured image data to be processed by the alignment determination processing section.

(13)

The image processing device according to any of (1) to (12), further including:

an alignment information addition processing section configured to add alignment information with respect to the captured panoramic image data to the other captured image data determined by the alignment determination processing section to be capable of alignment.

REFERENCE SIGNS LIST

0 captured image selection processing section
1 image processing device
2 alignment determination processing section
3 link processing section
50-1, 50-2 UUID
71 CPU
102 image processing section 102A panorama combination processing section
108 control section
201 image registration processing section

The invention claimed is:

1. An image processing device comprising:

a processor; and a memory storing program code executable by the processor to perform operations comprising:

alignment determination processing to access captured panoramic image data and other captured image data and to determine whether the other captured image data is capable of aligning with the captured panoramic image data such that a captured object is aligned between the captured panoramic image data and the other captured image data, the other captured image data including at least one of still image data or moving image data, wherein the still image data has a higher resolution than the captured panoramic image data; and image link processing to associate, to the captured panoramic image data, the other captured image data determined by the alignment determination processing to be capable of aligning with the captured panoramic image data, wherein the alignment determination processing determines that the other captured image data is incapable of aligning with the captured panoramic image data when a number of detected feature points in the other captured image data and the captured panoramic image data is less than a predetermined value.

2. The image processing device according to claim 1, wherein the moving image data and the still image data are high resolution image data captured at a telephoto angle of view compared to a set angle of view for capturing a panoramic image of the captured panoramic image data.

3. The image processing device according to claim 2, wherein the alignment determination processing changes determination techniques in accordance with an image type of the other captured image data.

4. The image processing device according to claim 3, wherein the other captured image data includes both the moving image data and the still image data, and wherein the alignment determination processing determines the moving image data on a determination criterion lower than a determination criterion of the still image data.

5. The image processing device according to claim 4, wherein the moving image data includes a number of pieces of frame image data, and wherein, when it is consecutively determined that more than a predetermined number of pieces of frame image data are incapable of alignment, or when a proportion of the number of pieces of frame image data determined to be incapable of alignment to a total number of frames is greater than or equal to a predetermined value, the alignment determination processing determines that the entire moving image data is incapable of aligning with the captured panoramic image data.

6. The image processing device according to claim 4, wherein the other captured image data includes multi-zoom image data, the multi-zoom image data includes a number of pieces of still image data captured at a plurality of telephoto angles of view compared to the set angle of view for capturing the panoramic image of the captured panoramic image data, wherein, when the other captured image data consists of the multi-zoom image data, the alignment determination processing determines whether each piece of the still image data included in the multi-zoom image data is capable of aligning with the captured panoramic image data, and wherein the image link processing does not associate, to the captured panoramic image data, the piece of the still image data determined by the alignment determination processing to be incapable of aligning with the captured panoramic image data.

7. The image processing device according to claim 6, wherein the alignment determination processing determines whether each piece of the still image data included in the multi-zoom image data is capable of aligning with the captured panoramic image data, and determines that the entire multi-zoom image data is incapable of aligning with the captured panoramic image data if one piece of the still image data is determined to be incapable of aligning with the captured panoramic image data.

8. The image processing device according to claim 1, wherein the alignment determination processing determines whether two target images are capable of aligning with each other by executing image registration processing, the image registration processing detects feature points and corresponding points in the two target images, local and global movement based on coordinates of the detected corresponding points, and optimal positional relationship between the two images using a robust estimation method.

9. The image processing device according to claim 8, wherein the alignment determination processing determines that the other captured image data is incapable of aligning with the captured panoramic image data when a number of the detected corresponding points in the other captured image data and the captured panoramic image data is less than a predetermined value.

10. The image processing device according to claim 8, wherein the alignment determination processing performs robust estimation processing of an RANSAC in the image registration processing, and determines that the other captured image data is incapable of aligning with the captured panoramic image data when a number of detected inliers acquired in a process of the robust estimation processing is less than a predetermined value.

11. The image processing device according to claim 1, wherein the operations further comprise:

selection processing to select the captured panoramic image data and the other captured image data to be processed by the alignment determination processing.

12. The image processing device according to claim 1, wherein the operations further comprise:

alignment information addition processing to add alignment information with respect to the captured panoramic image data to the other captured image data determined by the alignment determination processing to be capable of alignment.

13. An image processing method comprising:

alignment determination processing to access captured panoramic image data and other captured image data and to determine whether the other captured image data is capable of aligning with the captured panoramic image data such that a captured object is aligned between the captured panoramic image data and the other captured image data, the other captured image data including at least one of still image data or moving image data, wherein the still image data has a higher resolution than the captured panoramic image data; and image link processing to associate, to the captured panoramic image data, the other captured image data determined in the alignment determination procedure to be capable of aligning with the captured panoramic image data, wherein the alignment determination processing determines that the other captured image data is incapable of aligning with the captured panoramic image data when a number of detected feature points in the other captured image data and the captured panoramic image data is less than a predetermined value.

14. A non-transitory computer readable medium storing program code executable by an information processing device to perform operations comprising:

alignment determination processing to access captured panoramic image data and other captured image data and to determine whether the other captured image data is capable of aligning with the captured panoramic image data such that a captured object is aligned between the captured panoramic image data and the other captured image data, the other captured image data including at least one of still image data or moving image data, wherein the still image data has a higher resolution than the captured panoramic image data; and image link processing to associate, to the captured panoramic image data, the other captured image data determined in the alignment determination processing to be capable of aligning with the captured panoramic image data, wherein the alignment determination processing determines that the other captured image data is incapable of aligning with the captured panoramic image data when a number of detected feature points in the other captured image data and the captured panoramic image data is less than a predetermined value.

15. The non-transitory computer readable medium storing program code executable by an information processing device to perform operations according to claim 14, wherein the moving image data and the still image data are high resolution image data captured at a telephoto angle of view compared to a set angle of view for capturing a panoramic image of the captured panoramic image data.

16. The non-transitory computer readable medium storing program code executable by an information processing device to perform operations according to claim 15, wherein the alignment determination processing changes determination techniques in accordance with an image type of the other captured image data.

17. The non-transitory computer readable medium storing program code executable by an information processing device to perform operations according to claim 16, wherein the other captured image data includes both the moving image data and the still image data, and wherein the alignment determination processing determines the moving image data on a determination criterion lower than a determination criterion of the still image data.

18. The non-transitory computer readable medium storing program code executable by an information processing device to perform operations according to claim 17, wherein the moving image data includes a number of pieces of frame image data, and wherein, when it is consecutively determined that more than a predetermined number of pieces of frame image data are incapable of alignment, or when a proportion of the number of pieces of frame image data determined to be incapable of alignment to a total number of frames is greater than or equal to a predetermined value, the alignment determination processing determines that the entire moving image data is incapable of aligning with the captured panoramic image data.

19. The non-transitory computer readable medium storing program code executable by an information processing device to perform operations according to claim 17, wherein the other captured image data includes multi-zoom image data, the multi-zoom image data includes a number of pieces of still image data captured at a plurality of telephoto angles of view compared to the set angle of view for capturing the panoramic image of the captured panoramic image data, wherein, when the other captured image data consists of the multi-zoom image data, the alignment determination processing determines whether each piece of the still image data included in the multi-zoom image data is capable of aligning with the captured panoramic image data, and wherein the image link processing does not associate, to the captured panoramic image data, the piece of the still image data determined by the alignment determination processing to be incapable of aligning with the captured panoramic image data.

* * * * *